United States Patent
Yabu

(10) Patent No.: US 9,955,103 B2
(45) Date of Patent: Apr. 24, 2018

(54) VIDEO RECEIVING DEVICE, APPENDED INFORMATION DISPLAY METHOD, AND APPENDED INFORMATION DISPLAY SYSTEM

(71) Applicant: Panasonic Intellectual Property Management Co., Ltd., Osaka (JP)

(72) Inventor: Hiroshi Yabu, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/787,721

(22) PCT Filed: Jul. 2, 2014

(86) PCT No.: PCT/JP2014/003526
§ 371 (c)(1),
(2) Date: Oct. 28, 2015

(87) PCT Pub. No.: WO2015/011877
PCT Pub. Date: Jan. 29, 2015

(65) Prior Publication Data
US 2016/0073047 A1  Mar. 10, 2016

(30) Foreign Application Priority Data

Jul. 26, 2013 (JP) .................. 2013-155189

(51) Int. Cl.
*H04N 5/45* (2011.01)
*H04N 21/254* (2011.01)
(Continued)

(52) U.S. Cl.
CPC ............ *H04N 5/45* (2013.01); *H04N 21/254* (2013.01); *H04N 21/25825* (2013.01);
(Continued)

(58) Field of Classification Search
None
See application file for complete search history.

(56) References Cited

U.S. PATENT DOCUMENTS 7,712,123 B2  5/2010  Miyaoku et al.
8,199,221 B2  6/2012  Yoshizumi
(Continued)

FOREIGN PATENT DOCUMENTS

EP  1286541 A1  2/2003
EP  1 954 041 A1  8/2008
(Continued)

OTHER PUBLICATIONS

International Search Report of PCT application No. PCT/JP2014/003526 dated Oct. 7, 2014.
(Continued)

*Primary Examiner* — Michael Lee
*Assistant Examiner* — Samira Monshi
(74) *Attorney, Agent, or Firm* — McDermott Will & Emery LLP

(57) ABSTRACT

Additional information related to video signals input from an outside is obtained and superimposed on the video signals. Hence, video reception device which is configured to transmit and receive data through communication network includes input unit, video extraction unit, control unit and additional information display control unit. The control unit performs control of requesting video recognition device to perform video recognition processing on a partial video extracted by the video extraction unit, and obtaining additional information based on a result of the video recognition processing from the video recognition device. The additional information display control unit performs control of detecting whether or not a screen layout of video signals has (Continued)

been changed, and superimposing the additional information on the video signals based on a detection result.

11 Claims, 13 Drawing Sheets

(51) Int. Cl.
| | | |
|---|---|---|
| H04N 21/258 | (2011.01) | |
| H04N 21/431 | (2011.01) | |
| H04N 21/438 | (2011.01) | |
| H04N 21/44 | (2011.01) | |
| H04N 21/462 | (2011.01) | |
| H04N 21/488 | (2011.01) | |
| H04N 21/61 | (2011.01) | |
| H04N 21/81 | (2011.01) | |

(52) U.S. Cl.
CPC ..... *H04N 21/4312* (2013.01); *H04N 21/4383* (2013.01); *H04N 21/44008* (2013.01); *H04N 21/4622* (2013.01); *H04N 21/4886* (2013.01); *H04N 21/6125* (2013.01); *H04N 21/6175* (2013.01); *H04N 21/8133* (2013.01); *H04N 21/812* (2013.01)

(56) References Cited

U.S. PATENT DOCUMENTS

| | | |
|---|---|---|
| 8,254,720 B2 | 8/2012 | Matsuzaki |
| 8,421,921 B1 | 4/2013 | Woodall |
| 8,582,952 B2 | 11/2013 | Circlaeys et al. |
| 9,148,610 B2 | 9/2015 | Yabu |
| 9,456,237 B2 | 9/2016 | Oztaskent et al. |
| 9,626,798 B2 | 4/2017 | Zavesky |
| 2002/0001453 A1 | 1/2002 | Mizumura et al. |
| 2002/0097339 A1 | 7/2002 | Kwon |
| 2002/0126990 A1 | 9/2002 | Rasmussen et al. |
| 2002/0143902 A1 | 10/2002 | Chung et al. |
| 2003/0051252 A1 | 3/2003 | Miyaoku et al. |
| 2003/0084462 A1 | 5/2003 | Kubota et al. |
| 2003/0149983 A1 | 8/2003 | Markel |
| 2004/0165865 A1 | 8/2004 | Seo et al. |
| 2005/0071425 A1 | 3/2005 | Chung et al. |
| 2005/0172312 A1 | 8/2005 | Lienhart et al. |
| 2006/0187358 A1 | 8/2006 | Lienhart et al. |
| 2006/0200842 A1* | 9/2006 | Chapman ............ H04N 7/163 725/34 |
| 2007/0157242 A1 | 7/2007 | Cordray et al. |
| 2007/0233285 A1 | 10/2007 | Yamamoto |
| 2007/0261079 A1 | 11/2007 | Pack et al. |
| 2008/0181515 A1 | 7/2008 | Kondo |
| 2008/0310731 A1 | 12/2008 | Stojancic et al. |
| 2009/0006375 A1 | 1/2009 | Lax et al. |
| 2009/0034937 A1 | 2/2009 | Kusunoki et al. |
| 2009/0177758 A1 | 7/2009 | Banger et al. |
| 2009/0244372 A1 | 10/2009 | Petronelli et al. |
| 2009/0279738 A1 | 11/2009 | Sasaki |
| 2010/0067873 A1 | 3/2010 | Sasaki et al. |
| 2010/0259684 A1* | 10/2010 | Kambe ............ H04N 5/44504 348/598 |
| 2010/0318515 A1 | 12/2010 | Ramanathan et al. |
| 2011/0078202 A1 | 3/2011 | Kamibeppu |
| 2011/0129017 A1 | 6/2011 | Oami et al. |
| 2011/0135283 A1 | 6/2011 | Poniatowki et al. |
| 2011/0137976 A1 | 6/2011 | Poniatowski et al. |
| 2011/0181693 A1 | 7/2011 | Lee et al. |
| 2011/0243474 A1 | 10/2011 | Ito |
| 2011/0246202 A1* | 10/2011 | McMillan ............ G10L 19/018 704/270 |
| 2012/0020568 A1* | 1/2012 | Kogane ............ G06K 9/00221 382/195 |
| 2012/0075421 A1 | 3/2012 | Tsukagoshi |
| 2012/0092248 A1 | 4/2012 | Prabhala |
| 2012/0128241 A1 | 5/2012 | Jung |
| 2012/0320091 A1 | 12/2012 | Rajaraman et al. |
| 2012/0321125 A1 | 12/2012 | Choi et al. |
| 2013/0042289 A1 | 2/2013 | Park |
| 2013/0047178 A1 | 2/2013 | Moon et al. |
| 2013/0054645 A1 | 2/2013 | Bhagavathy et al. |
| 2013/0094590 A1 | 4/2013 | Laksono et al. |
| 2013/0106999 A1 | 5/2013 | Newton et al. |
| 2013/0111514 A1 | 5/2013 | Slavin et al. |
| 2013/0129219 A1 | 5/2013 | Takenouchi et al. |
| 2013/0145395 A1* | 6/2013 | Jeong ............ H04N 5/50 725/40 |
| 2013/0167189 A1 | 6/2013 | Lucas |
| 2013/0198773 A1 | 8/2013 | Jentz et al. |
| 2013/0202150 A1 | 8/2013 | Sinha et al. |
| 2013/0205321 A1 | 8/2013 | Sinha et al. |
| 2013/0230292 A1 | 9/2013 | Pierce et al. |
| 2013/0246457 A1 | 9/2013 | Stojancic et al. |
| 2013/0247117 A1 | 9/2013 | Yamada et al. |
| 2013/0254802 A1 | 9/2013 | Lax et al. |
| 2013/0308818 A1 | 11/2013 | MacIntosh et al. |
| 2014/0007155 A1* | 1/2014 | Vemparala ......... G06Q 30/0251 725/32 |
| 2014/0082655 A1 | 3/2014 | Moon et al. |
| 2014/0123204 A1 | 5/2014 | Moon et al. |
| 2014/0229485 A1 | 8/2014 | Icho et al. |
| 2014/0230002 A1 | 8/2014 | Kitazato |
| 2015/0020094 A1 | 1/2015 | Moon et al. |
| 2015/0026718 A1 | 1/2015 | Seyller |
| 2015/0193451 A1 | 7/2015 | Rowe |

FOREIGN PATENT DOCUMENTS

| | | |
|---|---|---|
| EP | 2 244 208 A2 | 10/2010 |
| EP | 2337345 A1 | 6/2011 |
| EP | 2760200 | 7/2014 |
| EP | 2763427 | 8/2014 |
| JP | H04-245552 A | 9/1992 |
| JP | H09-185720 A | 7/1997 |
| JP | H10-126721 A | 5/1998 |
| JP | 10-214258 | 8/1998 |
| JP | 2000-287189 A | 10/2000 |
| JP | 2000-293626 A | 10/2000 |
| JP | 2002-175311 A | 6/2002 |
| JP | 2002-209204 | 7/2002 |
| JP | 2002-232372 A | 8/2002 |
| JP | 2002-334010 A | 11/2002 |
| JP | 2004-007323 | 1/2004 |
| JP | 2004-104368 | 4/2004 |
| JP | 2004-303259 A | 10/2004 |
| JP | 2004-341940 A | 12/2004 |
| JP | 2005-167452 A | 6/2005 |
| JP | 2005-167894 | 6/2005 |
| JP | 2005-347806 A | 12/2005 |
| JP | 2006-030244 A | 2/2006 |
| JP | 2006-303936 A | 11/2006 |
| JP | 2007-049515 A | 2/2007 |
| JP | 2007-134948 A | 5/2007 |
| JP | 2008-040622 | 2/2008 |
| JP | 2008-042259 A | 2/2008 |
| JP | 2008-116792 | 5/2008 |
| JP | 2008-176396 A | 7/2008 |
| JP | 2008-187324 A | 8/2008 |
| JP | 2009-088777 | 4/2009 |
| JP | 2010-164901 A | 7/2010 |
| JP | 2010-271987 A | 12/2010 |
| JP | 2011-034323 A | 2/2011 |
| JP | 2011-059504 A | 3/2011 |
| JP | 2011-234343 A | 11/2011 |
| JP | 2012-055013 A | 3/2012 |
| JP | 2012-231383 A | 11/2012 |
| JP | 2013-038773 A | 2/2013 |
| JP | 2013-070268 | 4/2013 |
| JP | 2013-125191 A | 6/2013 |
| JP | 2013-164753 A | 8/2013 |
| WO | 2004/080073 A2 | 9/2004 |
| WO | 2007/039994 A1 | 4/2007 |
| WO | 2009/011030 A1 | 1/2009 |
| WO | 2010/022000 A2 | 2/2010 |

(56) References Cited

FOREIGN PATENT DOCUMENTS

| WO | 2013/042531 | | 3/2013 |
|---|---|---|---|
| WO | 2013/047948 | | 4/2013 |
| WO | 2013/103273 | A1 | 7/2013 |
| WO | 2013/119082 | A1 | 8/2013 |
| WO | 2014/006903 | A1 | 1/2014 |

OTHER PUBLICATIONS

The Extended European Search Report dated Jul. 5, 2016 for the related European Patent Application No. 14829140.4.
Gonzales R et al: "Digital Image Processing, Matching by correlation", Dec. 31, 2002 (Dec. 31, 2002), Digital Image Processing, Prentice-Hall Upper Saddle River, New Jersey, p. 701-704, XP002657364.
"Template matching", Wikipedia, Mar. 11, 2013 (Mar. 11, 2013), XP002759268, Retrieved from the Internet: URL:https://en.wikipedia.org/w/index.php?title=Template_matching&oldid=543510371 [retrieved on Jun. 28, 2016].
Non-Final Office Action issued in U.S. Appl. No. 14/787,759, dated Dec. 29, 2016.
Non-Final Office Action issued in U.S. Appl. No. 14/888,444, dated Oct. 6, 2016.
Non-Final Office Action issued in U.S. Appl. No. 14/888,447, dated Sep. 6, 2016.
Final Office Action issued in U.S. Appl. No. 14/888,447, dated Jan. 10, 2017.
Non-Final Office Action issued in U.S. Appl. No. 14/888,449, dated Nov. 21, 2016.
Final Office Action issued in U.S. Appl. No. 14/888,449, dated Mar. 6, 2017.
Non-Final Office Action issued in U.S. Appl. No. 14/888,445, dated Aug. 12, 2016.
The Extended European Search Report dated Jun. 14, 2016 for the related European Patent Application No. 14832570.7 (with English translation).
The Extended European Search Report dated Jul. 8, 2016 for the related European Patent Application No. 14838764.0.
The Extended European Search Report dated Jul. 19, 2016, for the related European Patent Application No. 14838765.7.
The Extended European Search Report dated Feb. 28, 2017 for the related European Patent Application No. 14841401.4.
The Extended European Search Report dated Mar. 3, 2017 for the related European Patent Application No. 14841377.6.
International Search Report of PCT application No. PCT/JP2014/003526 dated Oct. 7, 2014 (with English translation)
International Search Report of PCT application No. PCT/JP2014/003546 dated Oct. 7, 2014 (with English translation).
International Search Report issued in International Patent Application No. PCT/JP2014/003548, dated Oct. 7, 2014 (with English translation).
International Search Report of International Patent Application No. PCT/JP2014/003761, dated Oct. 21, 2014 (with English translation).
International Search Report of International Patent Application No. PCT/JP2014/003762, dated Oct. 21, 2014 (with English translation).
International Search Report of International Patent Application No. PCT/JP2014/003547, dated Oct. 7, 2014 (with English translation).
International Search Report of International Patent Application No. PCT/JP2015/004112, dated Oct. 27, 2015 (with English translation).
International Search Report of International Patent Application No. PCT/JP2015/003527, dated Aug. 11, 2015 (with English translation).
International Search Report of International Patent Application No. PCT/JP2015/004187, dated Oct. 20, 2015 (with English translation).
Final Office Action issued in U.S. Appl. No. 14/888,445, dated Jan. 30, 2017.
Non-Final Office Action issued in U.S. Appl. No. 14/890,121, dated Sep. 14, 2016.
Final Office Action issued in U.S. Appl. No. 14/890,121, dated Mar. 13, 2017.
Non-Final Office Action issued in related U.S. Appl. No. 13/958,863, dated Aug. 14, 2014.
Final Office Action issued in related U.S. Appl. No. 13/958,863, dated Jan. 23, 2015.
International Search Report of International Patent Application No. PCT/JP2014/003760, dated Oct. 7, 2014 (with English translation).
Notice of Allowance issued in U.S. Appl. No. 14/787,759, dated May 9, 2017.
Final Office Action issued in U.S. Appl. No. 14/888,444, dated May 15, 2017.
Non-Final Office Action issued in U.S. Appl. No. 14/888,445, dated Jun. 9, 2017.
Notice of Allowance issued in U.S. Appl. No. 14/888,447, dated Jul. 3, 2017.
Non-Final Office Action issued in U.S. Appl. No. 14/888,449, dated Jul. 5, 2017.
The Extended European Search Report dated May 29, 2017 for the related European Patent Application No. 15832982.1.
The Extended European Search Report dated May 11, 2017 for the related European Patent Application No. 15822221.6.
lotice of Allowance issued in U.S. Appl. No. 14/888,444, dated Oct. 2, 2017.
Non-Final Office Action issued U.S. Appl. No. 14/890,121, dated Sep. 6, 2017.
Notice of Allowance issued in U.S. Appl. No. 14/888,449, dated Nov. 24, 2017.
Notice of Allowance issued in U.S. Appl. No. 14/888,445, dated Nov. 20, 2017.
Non-Final Office Action issued in U.S. Appl. No. 15/302,460, dated Dec. 20, 2017.
Final Office Action issued in U.S. Appl. No. 14/890,121, dated Jan. 24, 2018.
Non-Final Office Action issued in U.S. Appl. No. 15/301,444, dated Jan. 26, 2018.

* cited by examiner

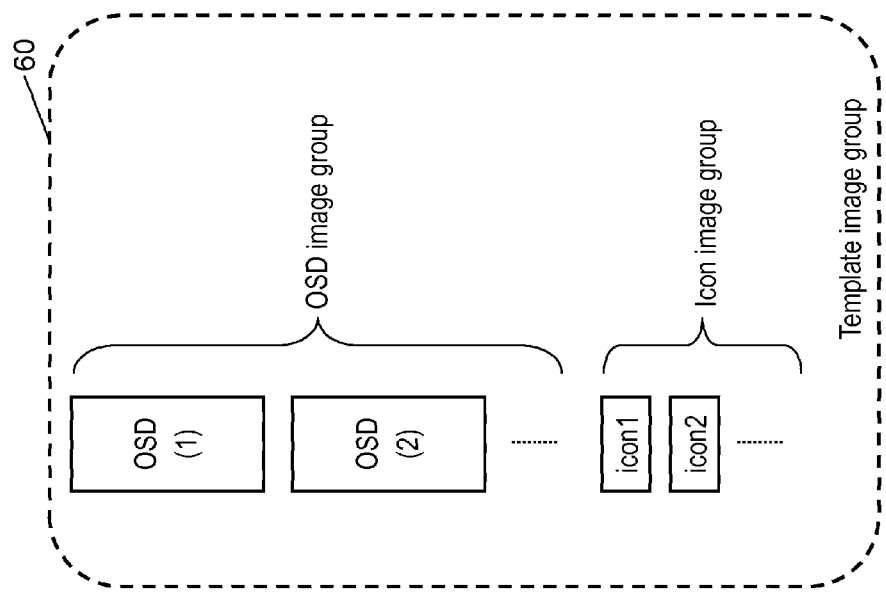
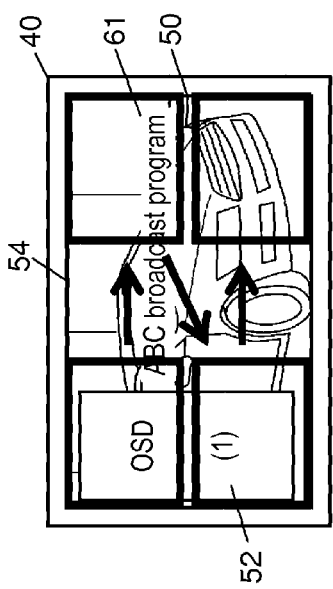
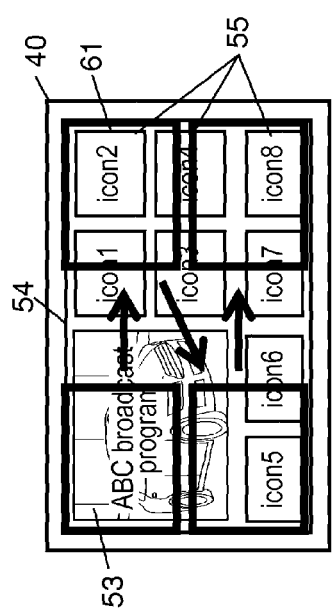

VIDEO RECEIVING DEVICE, APPENDED INFORMATION DISPLAY METHOD, AND APPENDED INFORMATION DISPLAY SYSTEM

CROSS-REFERENCE TO RELATED APPLICATIONS

This application is a U.S. national stage application of the PCT International Application No. PCT/JP2014/003526 filed on Jul. 2, 2014, which claims the benefit of foreign priority of Japanese patent application 2013-155189 filed on Jul. 26, 2013, the contents all of which are incorporated herein by reference.

TECHNICAL FIELD

The present disclosure relates to a video reception device which obtains additional information related to video signals input from an outside, and superimposes the additional information on the video signals.

BACKGROUND ART

Patent Literature 1 has disclosed a data processing system. In this system, a client device has transmitted video data to a server device which is a video recognition device through a network, and requested the server device to perform video recognition processing. The server device has performed video recognition based on the received video data, and transmitted a video recognition result to the client device through the network.

CITATION LIST

Patent Literature

PTL 1: Unexamined Japanese Patent Publication No. H10-214258

SUMMARY

The present disclosure provides a video reception device, an additional information display method and an additional information display system which are effective to perform control of obtaining additional information related to video signals input from an outside, and superimposing the obtained additional information on the video signals.

The video reception device according to the present disclosure is configured to transmit and receive data through a communication network, and includes an input unit, a video extraction unit, a control unit and an additional information display control unit. The input unit is configured to receive an input of a video signal output from a video transmission device installed outside. The video extraction unit is configured to extract a partial video for video recognition processing, from the video signal. The control unit is configured to perform control of transmitting the partial video to a video recognition device connected to the communication network so as to request the video recognition device to perform the video recognition processing, obtaining a result of the video recognition processing from the video recognition device, and obtaining additional information based on the result of the video recognition processing from an additional information distribution device connected to the communication network. An additional information display control unit is configured to perform control of detecting whether or not a screen layout of a video signal has been changed, and superimposing the additional information on the video signal based on a result of the detection.

An additional information display method according to the present disclosure is an additional information display method of a video reception device configured to transmit and receive data through a communication network, and includes extracting a partial video for video recognition processing, from a video signal input from an outside, transmitting the partial video to a video recognition device connected to the communication network so as to request the video recognition device to perform the video recognition processing, and obtaining a result of the video recognition processing from the video recognition device, obtaining additional information based on the result of the video recognition processing, from an additional information distribution device connected to the communication network, detecting whether or not a screen layout of the video signal has been changed, and performing control of superimposing the additional information on the video signal based on a result of the detection.

An additional information display system according to the present disclosure includes a video reception device, a video recognition device and an additional information distribution device configured to transmit and receive data to each other through a communication network. The video reception device includes an input unit, a video extraction unit, a control unit and an additional information display control unit. The input unit is configured to receive an input of a video signal output from a video transmission device installed outside. The video extraction unit is configured to extract a partial video for video recognition processing, from the video signal. The control unit is configured to perform control of transmitting the partial video to a video recognition device through the communication network so as to request the video recognition device to perform the video recognition processing, obtaining a result of the video recognition processing from the video recognition device through the communication network, and obtaining additional information based on the result of the video recognition processing from an additional information distribution device through the communication network. An additional information display control unit is configured to perform control of detecting whether or not a screen layout of a video signal has been changed, and superimposing the additional information on the video signal based on a result of the detection. The video recognition device is configured to perform the video recognition processing on the partial video received through the communication network, and transmit the result of the video recognition processing to the video reception device through the communication network. The additional information distribution device is configured to transmit additional information corresponding to the result of the video recognition processing received through the communication network, to the video reception device through the communication network.

BRIEF DESCRIPTION OF DRAWINGS

FIG. 6A is a view schematically illustrating an example of template matching performed by the video reception device according to the first exemplary embodiment.

FIG. 6B is a view schematically illustrating another example of the template matching performed by the video reception device according to the first exemplary embodiment.

FIG. 6C is a view schematically illustrating an example of a template image group used for template matching performed by the video reception device according to the first exemplary embodiment.

DESCRIPTION OF EMBODIMENTS

Exemplary embodiments will be described in detail below optionally with reference to the drawings. However, the exemplary embodiments will not be described in detail more than necessary in some cases. For example, in some cases, matters which have already been well known will not be described in detail, and substantially same components will not be described again. This is to prevent the following description from being redundant more than necessary, and help one of ordinary skill in the art understand the following description.

In addition, the accompanying drawings and the following description are provided to make it easy for one of ordinary skill in the art to sufficiently understand the present disclosure, and do not intend to limit the subject matters recited in the claims.

First Exemplary Embodiment

The first exemplary embodiment will be described below with reference to FIGS. 1 to 11.

[1-1. Configuration]

[1-1-1. Outline of System Configuration]

Figure 1:
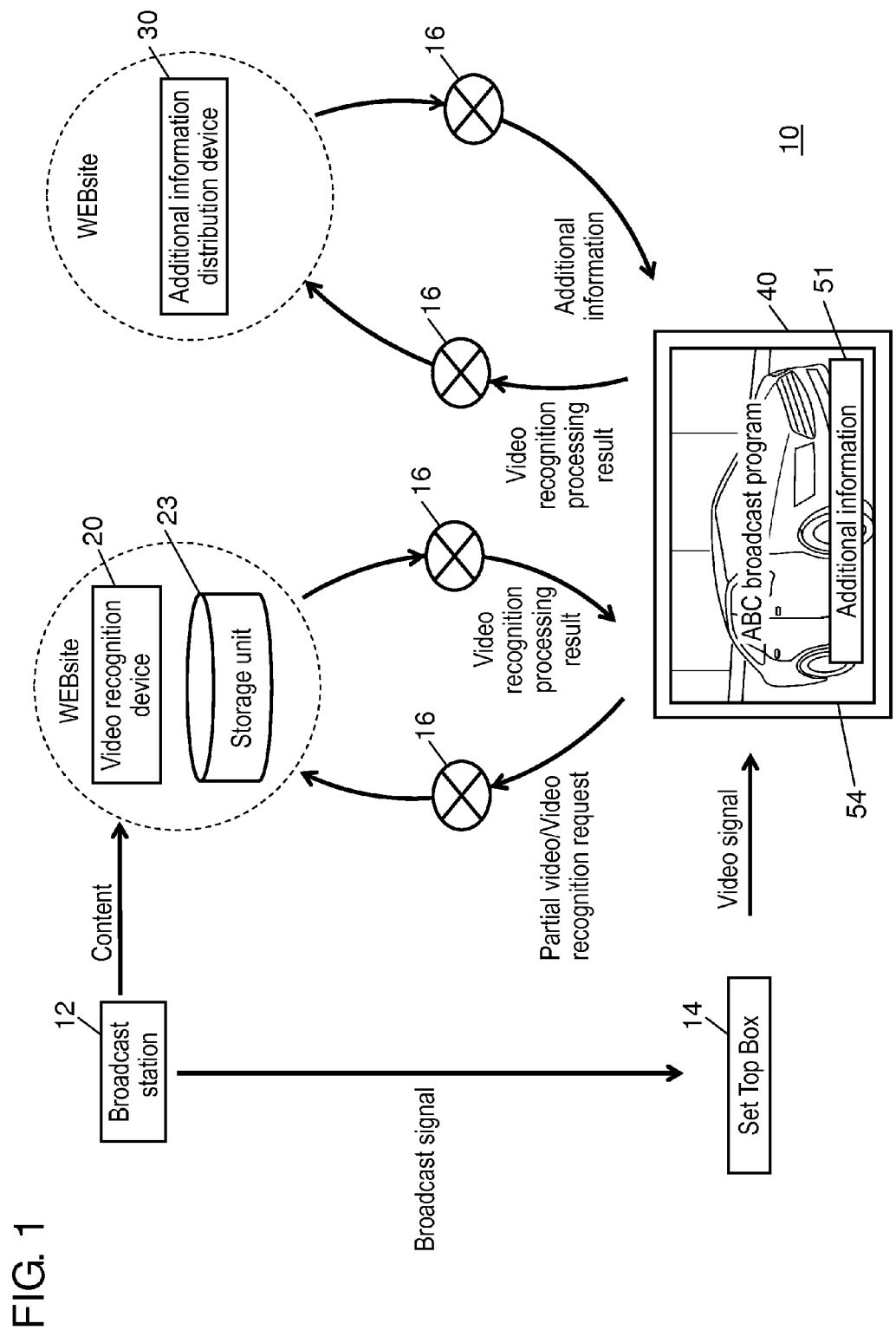
FIG. 1 is a view schematically illustrating an example of a configuration of an additional information display system according to a first exemplary embodiment.

FIG. 1 is a view schematically illustrating an example of a configuration of additional information display system 10 according to the first exemplary embodiment. Additional information display system 10 includes broadcast station 12, STB (Set Top Box) 14 which is a video transmission device, video recognition device 20, additional information distribution device 30 and video reception device 40. Additional information display system 10 is a communications system which is configured to specify which content a video received by video reception device 40 is, using a video recognition technique of video recognition device 20, obtain additional information related to the content from additional information distribution device 30, and display the additional information on video reception device 40.

Video reception device 40, video recognition device 20 and additional information distribution device 30 are connected with each other through communication network 16.

Communication network 16 is configured as a wired network, a wireless network or a combination of wired and wireless networks. Communication network 16 is, for example, the Internet, yet may be an intranet, a commercial line, other communication lines or a combination of the intranet, the commercial line and other communication lines.

Video reception device 40 and STB 14 are connected with each other through a communications interface. The communications interface is, for example, a HDMI (registered trademark) (High-Definition Multimedia Interface) yet may be a video cable or a wireless communications interface such as Wi-Fi (registered trademark), Bluetooth (registered trademark) or a wireless LAN (Local Area Network).

Broadcast station 12 is a transmission device which is configured to transmit (broadcast) broadcast signals. Broadcast station 12 broadcasts a television program including a main program and commercial messages (CM) by converting the television program into video signals, and superimposing the video signals on broadcast signals. The main program and the CMs are switched to each other as time passes. A main program and CMs will be referred to as "content" below. That is, broadcast station 12 broadcasts content which is switched as time passes. In addition, the transmission device is by no means limited to broadcast station 12, and only needs to transmit or broadcast content which is switched as time passes.

STB 14 is a receiver (tuner) which is configured to receive broadcast signals broadcast from broadcast station 12 and extract video signals from the broadcast signals. STB 14 may have a function of decoding the received video signals when, for example, broadcast station 12 broadcasts digital broadcast signals. STB 14 receives a channel selected from a plurality of channels broadcast by broadcast station 12 according to a user's instruction, and outputs video signals of this channel to video reception device 40 through the communications interface (e.g. the HDMI (registered trademark)). In addition, the video transmission device is by no means limited to STB 14, and may be a recording device or the like which has, for example, a recording function, a broadcast signal receiving function and a video signal output function.

Video reception device 40 is a video reception device which is configured to display, on displaying unit 54, a video based on video signals input from an outside, and is, for example, a television receiver. Video reception device 40 is connected to communication network 16, and can transmit and receive data to and from video recognition device 20 and additional information distribution device 30 through communication network 16.

Video reception device 40 according to the present exemplary embodiment is configured to perform the following operations. Video reception device 40 performs video recognition processing on video signals input from the video transmission device (e.g. STB 14) through the communication network using video recognition device 20, and specifies content represented by these video signals. Further, video reception device 40 obtains additional information (e.g. advertisement information) related to the content from additional information distribution device 30, superimposes the obtained additional information on these video signals and displays the additional information on displaying unit 54.

More specifically, video reception device 40 cyclically extracts a partial video by cyclically clipping part of input video signals, and transmits the partial video and a video recognition processing request (also referred to as a "video recognition request" below) to video recognition device 20 through communication network 16. Further, video reception device 40 obtains the video recognition processing result of the partial video from video recognition device 20 through communication network 16, and obtains additional information related to the obtained video recognition processing result from additional information distribution device 30 through communication network 16. Furthermore, video reception device 40 superimposes an image (indicated as "additional information 51" in FIG. 1) which is based on the obtained additional information, on a video which is being displayed on displaying unit 54. Details of the above will be described later.

In addition, in the present exemplary embodiment, an example where additional information is "advertisement information related to content" will be described. However, the additional information is by no means limited to advertisement information and may be, for example, tourist information, history information, personal profile information, a URL (Uniform Resource Locator), public bulletin information, information related to a program which is being broadcast and social information such as Twitter (registered trademark).

Video recognition device 20 is a server device connected to communication network 16, and is a website which performs content specifying processing based on video recognition processing. The content specifying processing is processing of performing video recognition processing on a received partial video, and specifying content represented by the partial video based on the video recognition processing result. Hence, video recognition device 20 analyzes the content broadcast by broadcast station 12, and performs video recognition processing using this analysis result.

Video recognition device 20 obtains substantially all items of contents broadcast from broadcast station 12. Further, video recognition device 20 analyzes the obtained content, checks a time, a volume, a broadcast format, details, a genre, characters, a time table or the like of the content, and creates analysis information. Furthermore, video recognition device 20 creates a fingerprint from video signals of the content obtained from broadcast station 12. This fingerprint is information for recognizing a video, and is, for example, a hash value of each image which configures a moving image. Video recognition device 20 may obtain content by receiving broadcast signals broadcast from the broadcast station, or may obtain content by receiving video signals transmitted from broadcast station 12 through a dedicated video line or the like. Further, this analysis may be performed, for example, automatically or manually by an operator. Analysis information which is an analysis result of each content and a fingerprint are stored in storage unit 23 of video recognition device 20 per video of each content (e.g. video signals of a plurality of frames).

When receiving a video recognition request accompanied by a partial video transmitted from video reception device 40 through communication network 16, video recognition device 20 cross-checks a fingerprint generated from the partial video and fingerprints generated in advance by video recognition device 20 and stored in storage unit 23, performs video recognition processing on this partial video and specifies the content corresponding to this partial video. Thus, video recognition device 20 performs content specifying processing of determining what content video the partial video transmitted from video reception device 40 is, and specifying the content. Further, video recognition device 20 reads an analysis result (analysis information) related to the specified content from storage unit 23, and returns the read information as the video recognition processing result to video reception device 40 through communication network 16.

Video recognition processing based on such a method (content specifying processing based on video recognition processing) will be also referred to as "ACR (Automatic Content Recognition)".

Additional information distribution device 30 is a server device connected to communication network 16, and is a website (advertisement distribution site) which holds and distributes advertisement information of various commercial goods. When receiving the video recognition processing result (analysis information based on the video recognition processing result which video reception device 40 obtains from video recognition device 20) transmitted from video reception device 40 through communication network 16, additional information distribution device 30 transmits additional information related to this video recognition processing result (analysis information) to video reception device 40 through communication network 16. This additional information is, for example, advertisement information related to content specified by video recognition processing.

[1-1-2. Configurations of Video Recognition Device and Video Reception Device]

Figure 2:
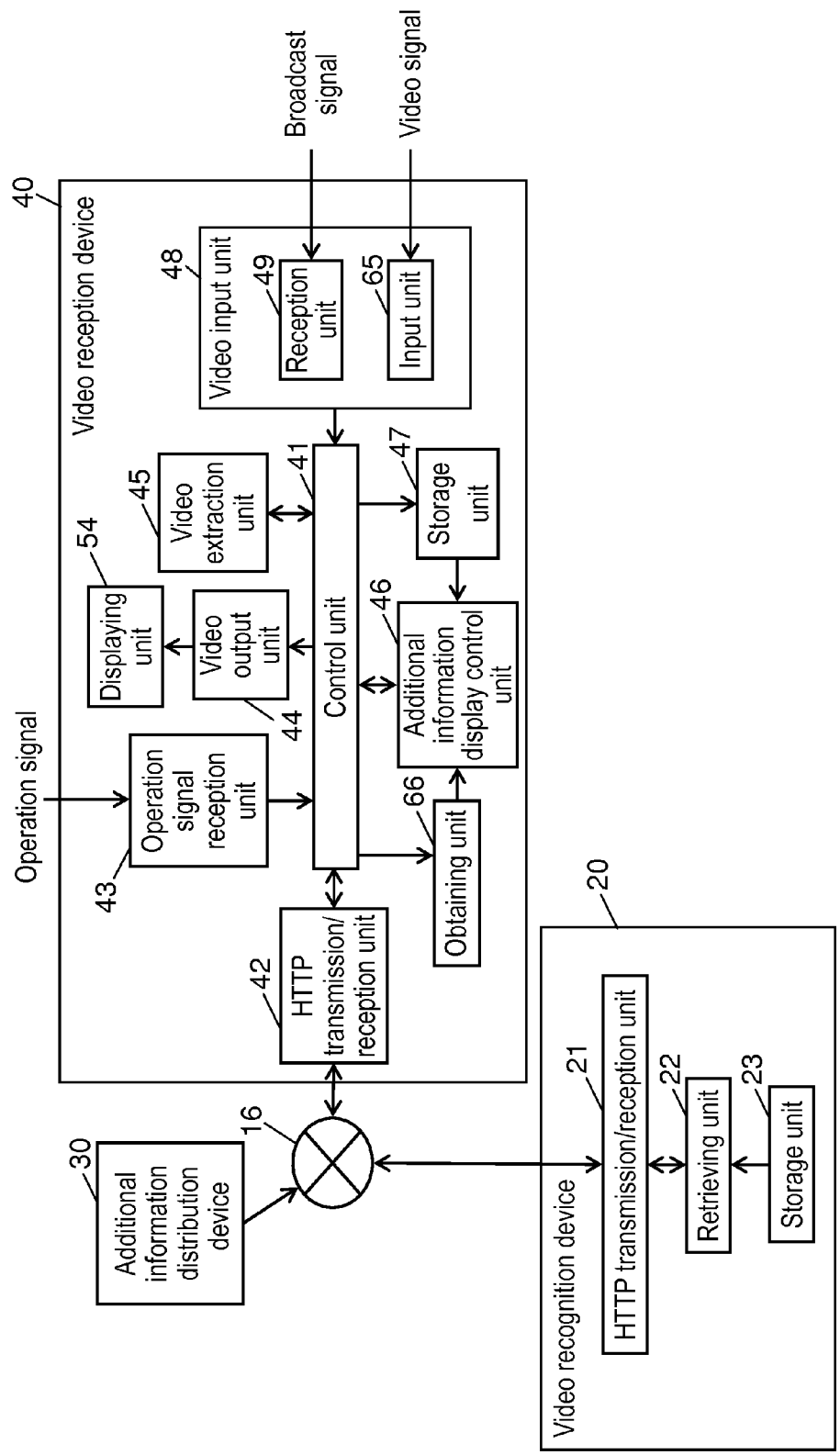
FIG. 2 is a block diagram schematically illustrating an example of configurations of a video recognition device and a video reception device according to the first exemplary embodiment.

FIG. 2 is a block diagram schematically illustrating an example of configurations of video recognition device 20 and video reception device 40 according to the first exemplary embodiment.

In addition, FIG. 2 illustrates a main circuit block related to an operation described in the present exemplary embodiment, and does not illustrate functions and circuit blocks related to other operations for ease of understanding of the operations described in the present exemplary embodiment. Further, each circuit block illustrated in FIG. 2 may be configured as an independent circuit. Alternatively, each circuit block may be configured such that a program created to realize one or a plurality of circuit blocks illustrated in FIG. 2 is executed by a processor.

Video recognition device 20 is a server device which includes HTTP (Hypertext Transfer Protocol) transmission/reception unit 21, retrieving unit 22 and storage unit 23. Video recognition device 20 is configured to provide service of content specifying processing based on video recognition processing, to video reception device 40 through communication network 16.

HTTP transmission/reception unit 21 is an interface for communication, and is, for example, a communications adapter which is adapted to standards of the Ethernet (registered trademark). HTTP transmission/reception unit 21 is configured to transmit and receive data to and from video reception device 40 through communication network 16.

Storage unit 23 is a storage device which is configured by, for example, a HDD (Hard Disk Drive). Storage unit 23 is configured to associate a fingerprint of content broadcast from broadcast station 12, and analysis information of an analysis result of the content with the content to store. This fingerprint is, for example, a hash value of each image which configures a moving image.

Storage unit 23 associates fingerprints and analysis results (analysis information) of, for example, all channels (e.g. 300 channels) broadcast from broadcast station 12 to store per content (e.g. a main program or a CM) with a slight time delay (e.g. 10 seconds) from a start of a broadcast. This analysis result (analysis information) may include, for example, a program title, a CM title, a program outline, a CM outline, characters, a place related to a video, and a URL.

Retrieving unit 22 is configured to, when receiving a video recognition request accompanied by the partial video transmitted from video reception device 40 through HTTP transmission/reception unit 21, perform content specifying processing based on video recognition processing using the partial video, and return the result (analysis information) to video reception device 40 through HTTP transmission/reception unit 21. In the present exemplary embodiment, a result of content specifying processing based on video recognition processing using a partial video will be also referred to simply as a "video recognition processing result".

More specifically, retrieving unit 22 receives the video recognition request accompanied by the partial video transmitted from video reception device 40, through communication network 16 and HTTP transmission/reception unit 21. Next, retrieving unit 22 generates a fingerprint of the received partial video (e.g. a hash value of each image which configures the partial video), cross-checks the generated fingerprint and the fingerprints stored in storage unit 23, and retrieves a fingerprint corresponding to the received partial video (video recognition processing). Further, retrieving unit 22 specifies the content corresponding to the fingerprint specified based on this retrieval result as content corresponding to the received partial video (content specifying processing). Thus, retrieving unit 22 specifies the content corresponding to the received partial video. Further, retrieving unit 22 reads the analysis result (analysis information) associated with the specified content from storage unit 23, and returns the read analysis result as the video recognition processing result to video reception device 40 through HTTP transmission/reception unit 21 and communication network 16.

Video reception device 40 includes control unit 41, HTTP transmission/reception unit 42, operation signal reception unit 43, video output unit 44, displaying unit 54, video extraction unit 45, additional information display control unit 46, storage unit 47, obtaining unit 66 and video input unit 48. Video reception device 40 is configured to perform content specifying processing based on video recognition processing using video recognition device 20, obtain analysis information which is the video recognition processing result from video recognition device 20, obtain additional information (e.g. advertisement information) related to the analysis information from additional information distribution device 30, superimpose an image of the additional information (e.g. the advertisement information related to a video) on the video (content) of the received video signals and display the additional information on displaying unit 54.

HTTP transmission/reception unit 42 is an interface for communication, and is, for example, a communications adapter which is adapted to standards of the Ethernet (registered trademark). HTTP transmission/reception unit 42 is configured to transmit and receive data to and from video recognition device 20 through communication network 16.

Operation signal reception unit 43 is configured to receive an operation signal (an operation signal for video reception device 40) output from an operation unit (not illustrated) such as a remote control device (abbreviated as a "remote controller" below) which has received a user's operation. Operation signal reception unit 43 may be configured to receive a signal output from the remote controller including a gyro sensor based on a physical fluctuation of this remote controller.

Video input unit 48 is a reception circuit and a decoder, and includes reception unit 49 which is configured to receive broadcast signals broadcast from the broadcast station, and input unit 65 which is configured to receive an input of video signals output from the video transmission device (e.g. STB 14). Video signals received by video input unit 48 include content (e.g. a main program and CMs) switched as time passes.

Reception unit 49 is configured to receive broadcast signals transmitted from broadcast station 12, through an antenna (not illustrated) or the like.

Input unit 65 is an interface which is configured to receive an input of video signals output from the video transmission device installed outside. Input unit 65 is configured to adapt to, for example, the standards of the HDMI (registered trademark), and can receive video signals transmitted from the video transmission device through the HDMI (registered trademark). This video transmission device is, for example, STB 14 yet may be a video recording/playback device or the like. Further, the input unit may be configured to receive video signals transmitted through a video cable and video signals transmitted by wireless communication.

Video output unit 44 has a function of controlling displaying unit 54, and is configured to control displaying unit 54 based on the video signals input from video input unit 48 and display a video based on the video signals on displaying unit 54. When receiving an input of additional information from control unit 41, video output unit 44 superimposes an image based on the additional information, on the video which is being displayed on displaying unit 54.

Displaying unit 54 is a display which is configured to display a video based on video signals, and is, for example, a LCD (Liquid Crystal Display). However, the present exemplary embodiment is by no means limited to this configuration. Displaying unit 54 may be a PDP (Plasma Display Panel), an OLED (Organic Electro Luminescence Display) or the like.

Additional information display control unit 46 is configured to perform control of displaying additional information. More specifically, additional information display control unit 46 is configured to determine whether or not to display the additional information on displaying unit 54, and output to control unit 41, for example, an instruction to display the additional information on displaying unit 54, an instruction to continuously display the additional information which is being displayed on displaying unit 54, and an instruction to hide the additional information which is being displayed on displaying unit 54 based on this determination.

Additional information display control unit 46 performs video recognition processing (content specifying processing based on the video recognition processing) based on a partial video extracted by video extraction unit 45 using video recognition device 20. Further, additional information display control unit 46 analyzes the partial video extracted by video extraction unit 45. Details of the above will be described later. Further, additional information display control unit 46 determines based on the analysis result whether to display the additional information obtained from additional information distribution device 30, on displaying unit 54 based on the video recognition processing result obtained from video recognition device 20 (whether or not to superimpose the additional information on video signals) or continuously display or hide the additional information which is being displayed on displaying unit 54, and output an instruction based on this determination to control unit 41. In addition, additional information display control unit 46 may be configured to generate a fingerprint (e.g. a hash value of each image which configures a partial image) from the partial image extracted by video extraction unit 45, and perform video recognition processing based on the generated fingerprint using video recognition device 20.

Video extraction unit 45 is configured to extract a partial video from the video signals input from video input unit 48. Video extraction unit 45 is configured to extract from video signals a partial video of a predetermined period of time which is part of the video signals at a predetermined cycle. When, for example, the predetermined cycle is 3 seconds and a predetermined period of time is 3 seconds, video extraction unit 45 repeats an operation of extracting a partial video of 3 seconds from the video signals every 3 second. That is, video extraction unit 45 repeats an operation of continuously extracting a partial video of 3 seconds from the video signals every 3 second without a pause. Further, when, for example, the predetermined cycle is 15 seconds and a predetermined period of time is 3 seconds, video extraction unit 45 repeats an operation of extracting a partial video of 3 seconds from the video signals every 15 second. That is, video extraction unit 45 repeats an operation of extracting a partial video of 3 seconds from the video signals at intervals of 12 second. In addition, a partial video to be extracted from video signals may not be extracted in units of seconds, and, for example, may be extracted in units of a predetermined number of frames at a video frame rate.

Storage unit 47 is a storage device which is configured by, for example, a non-volatile memory. Storage unit 47 stores, for example, program meta information such as an electronic program guide (EPG) received by video input unit 48, the additional information and the display control information of the additional information obtained from additional information distribution device 30 through HTTP transmission/reception unit 42, model information of STB 14 which transmits video signals to video reception device 40, and a template image group of a plurality of video transmission devices including STB 14. The display control information of the additional information is information used to perform control of displaying the additional information, and includes, for example, information indicating a display period of the additional information.

Control unit 41 is configured to control each circuit block included in video reception device 40. Control unit 41 employs a configuration including, for example, a non-volatile memory such as a ROM which stores programs (e.g. applications), a CPU which executes the programs, and a volatile memory such as a RAM which temporarily stores data, parameters and the like when the CPU executes a program.

Control unit 41 performs, for example, the following control. Control unit 41 controls video extraction unit 45 such that video extraction unit 45 extracts a partial video from video signals at predetermined cycles. Further, control unit 41 controls each circuit block to, every time video extraction unit 45 extracts a partial video, transmit the extracted partial video together with a video recognition request to video recognition device 20 through HTTP transmission/reception unit 42 and communication network 16, and request video recognition device 20 to perform the video recognition processing on this partial video. Furthermore, control unit 41 controls each circuit block to obtain the video recognition processing result of this partial video from video recognition device 20 through communication network 16 and HTTP transmission/reception unit 42, and obtain additional information based on the video recognition processing result from additional information distribution device 30 through communication network 16 and HTTP transmission/reception unit 42. Still further, control unit 41 controls each circuit block to store the obtained additional information in storage unit 47, output the additional information to video output unit 44, superimpose the additional information on a video which is being displayed on displaying unit 54 and display the additional information. In this case, control unit 41 controls each circuit block to hide the additional information which is being displayed on displaying unit 54 when additional information display control unit 46 determines to "hide the additional information".

In addition, additional information display system 10 may be configured such that, when video reception device 40 requests video recognition device 20 to perform video recognition processing, video reception device 40 creates a signal (data) indicating a video recognition processing request, and transmits this signal as the video recognition request to video recognition device 20. However, for example, a rule may be set between video reception device 40 and video recognition device 20 such that transmitting a partial video from video reception device 40 to video recognition device 20 is to request video recognition device 20 to perform video recognition processing instead of transmitting such a signal (data).

Obtaining unit 66 obtains a template video from video recognition device 20 through communication network 16 and HTTP transmission/reception unit 42. The template video includes video signals of content which video recognition device 20 obtains from the broadcast station, and is included in the video recognition processing result which control unit 41 obtains from video recognition device 20. The template video is used for local content detection described later. Details of the above will be described later.

Next, an outline of display control of additional information performed by additional information display control unit 46 will be described with reference to FIGS. 3A to 3D.

Figure 3A:
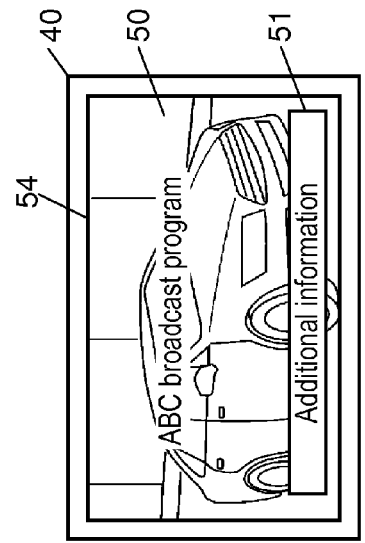
FIG. 3A is a view schematically illustrating an example of a video displayed on a displaying unit of the video reception device according to the first exemplary embodiment.
Figure 3B:
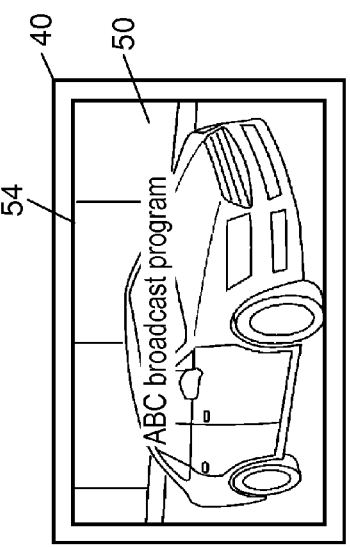
FIG. 3B is a view schematically illustrating another example of a video displayed on the displaying unit of the video reception device according to the first exemplary embodiment.
Figure 3C:
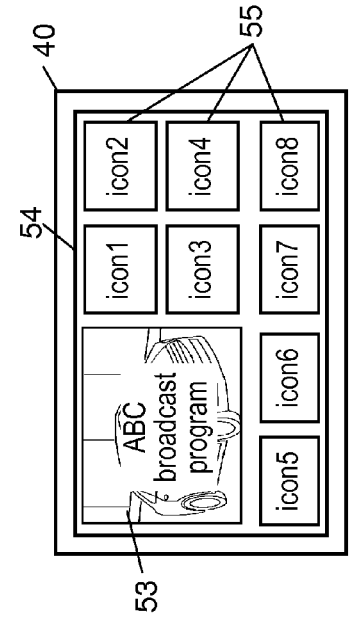
FIG. 3C is a view schematically illustrating still another example of a video displayed on the displaying unit of the video reception device according to the first exemplary embodiment.
Figure 3D:
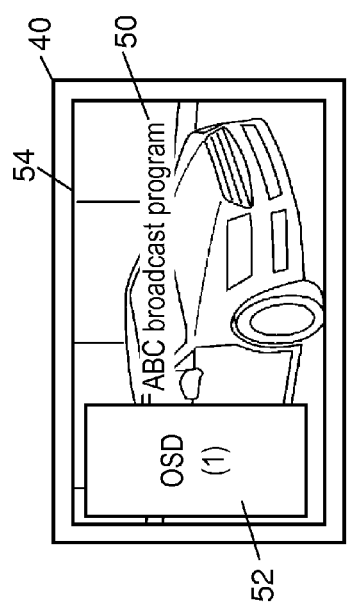
FIG. 3D is a view schematically illustrating yet another example of a video displayed on the displaying unit of the video reception device according to the first exemplary embodiment.

FIG. 3A is a view schematically illustrating an example of a video displayed on displaying unit 54 of video reception device 40 according to the first exemplary embodiment. FIG. 3B is a view schematically illustrating another example of a video displayed on displaying unit 54 of video reception device 40 according to the first exemplary embodiment. FIG. 3C is a view schematically illustrating still another example of a video displayed on displaying unit 54 of video reception device 40 according to the first exemplary embodiment. FIG. 3D is a view schematically illustrating yet another example of a video displayed on displaying unit 54 of video reception device 40 according to the first exemplary embodiment.

FIG. 3A illustrates an example where video 50 based on video signals input from STB 14 to input unit 65 is displayed as is on displaying unit 54. In addition, FIG. 3A illustrates an example where an "ABC broadcast program" is displayed as an example of video 50.

FIG. 3B illustrates an example where a video obtained by superimposing on video 50 additional information 51 obtained from additional information distribution device 30 based on a video recognition processing result is displayed on displaying unit 54. In addition, additional information 51 illustrated in FIG. 3B is only an example of additional information. A display position, a display size or the like of additional information are by no means limited to a display position, a display size or the like of additional information 51 illustrated in FIG. 3B.

FIG. 3C illustrates an example where STB 14 receives a user's operation such as volume adjustment and menu display, and OSD (On Screen Display) image 52 is superimposed on video 50 according to this operation. This example will be referred to as "Case 1" below.

FIG. 3D illustrates an example where a user's operation sets a menu display mode to STB 14, and a plurality of icons 55 corresponding to each of options and reduced video 53 obtained by reducing video 50 are simultaneously displayed on displaying unit 54 to display a plurality of options on displaying unit 54. This example will be referred to as "Case 2" or "content reduction display" below.

In Case 1 illustrated in FIG. 3C and Case 2 illustrated in FIG. 3D, additional information display control unit 46 determines to "hide additional information 51 which is being displayed on displaying unit 54", and instructs control unit 41 to hide additional information 51. Details of display control of additional information 51 will be described later.

[1-2. Operation]

An operation of video reception device 40 configured as described above will be described with reference to FIGS. 4 to 11.

As described above, when receiving an input of video signals output from the video transmission device such as STB 14, video reception device 40 performs video recognition processing on the video signals using video recognition device 20. Further, video reception device 40 obtains additional information 51 (e.g. advertisement information) related to the video recognition processing result from additional information distribution device 30, superimposes obtained additional information 51 on these video signals and displays the additional information on displaying unit 54.

Video reception device 40 displays or hides obtained additional information 51 (e.g. advertisement information) according to an advertisement period included in advertisement display control information obtained together with this additional information 51. This advertisement display control information is a type of the above-described display control information of additional information. Meanwhile, when a screen layout of the video which is being displayed on displaying unit 54 is changed, even before the advertisement display period ends, video reception device 40 hides additional information 51 (e.g. advertisement information) which is being displayed. In addition, the screen layout refers to a state of a video which is being displayed on displaying unit 54 (the layout of the video which is shown on a screen of displaying unit 54). In the present exemplary embodiment, changing a video which displays content to a video which displays information other than the content by superimposing the information on the content, or changing a video which displays content to another video refers to "a change of a screen layout".

An operation of hiding advertisement information which is being displayed on displaying unit 54 in an advertisement display period will be described below.

[1-2-1. Operation of Additional Information Display Control]

Figure 4:
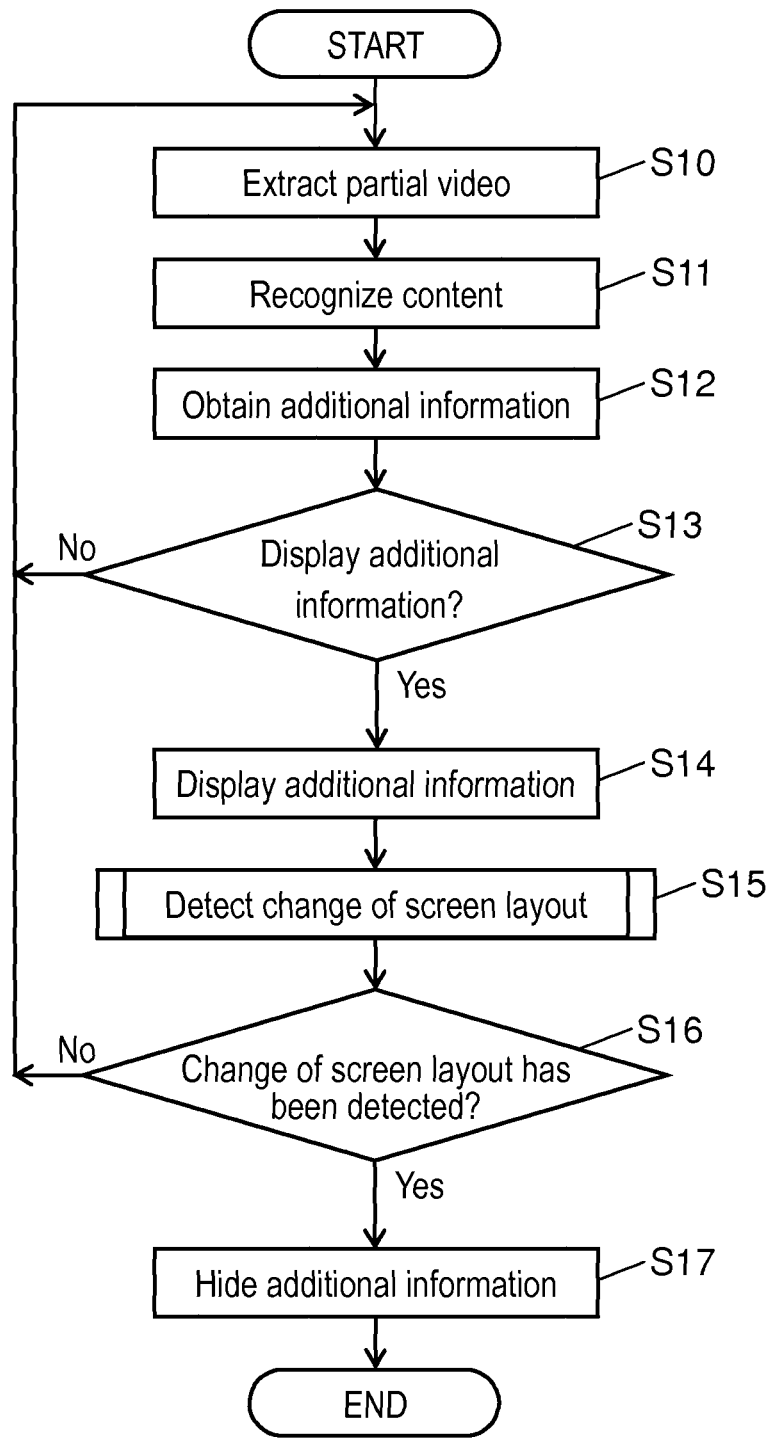
FIG. 4 is a flowchart schematically illustrating an operation of additional information display control performed by the video reception device according to the first exemplary embodiment.

FIG. 4 is a flowchart schematically illustrating an operation of additional information display control performed by video reception device 40 according to the first exemplary embodiment.

Video extraction unit 45 of video reception device 40 extracts a partial video from video signals output from STB 14 and input to input unit 65 (step S10).

Control unit 41 controls each circuit block to transmit the partial video extracted by video extraction unit 45 together with a video recognition request to video recognition device 20 through HTTP transmission/reception unit 42 and communication network 16. Further, control unit 41 controls each circuit block to receive a video recognition processing result (analysis information) which is a response to the request from video recognition device 20 through communication network 16 and HTTP transmission/reception unit 42. Thus, control unit 41 recognizes what content is represented by the video signals input from STB 14 to input unit 65 (step S11).

Control unit 41 controls each circuit block to transmit information indicating the content determined in step S11, to additional information distribution device 30 through HTTP transmission/reception unit 42 and communication network 16. Further, control unit 41 controls each circuit block to obtain advertisement information related to the content and advertisement display control information, from additional information distribution device 30 through communication network 16 and HTTP transmission/reception unit 42 (step S12). In this case, control unit 41 may control each circuit block to obtain the advertisement information related to the content and the advertisement display control information from additional information distribution device 30 by designating a URL related to the content and accessing additional information distribution device 30. Control unit 41 may control each circuit block to obtain the advertisement information and the advertisement display control information by designating this URL and accessing additional information distribution device 30 when, for example, analysis information obtained from video recognition device 20 includes the URL.

Next, control unit 41 controls each circuit block to store the advertisement information obtained in step S12 in storage unit 47. Additional information display control unit 46 determines whether or not to display the advertisement information on displaying unit 54, based on the advertisement display period included in the display control information (step S13).

When it is determined in step S13 that the advertisement information is not displayed since, for example, the advertisement display period ends (No), additional information display control unit 46 instructs control unit 41 to hide the advertisement information. According to this instruction, control unit 41 controls each circuit block to hide the advertisement information when the advertisement information is being displayed on displaying unit 54, and continues a state where the advertisement information is not displayed on displaying unit 54 when the advertisement information is not displayed on displaying unit 54. Further, the flow returns to step S10 to repeat a series of these operations.

When it is determined in step S13 that the advertisement information is displayed for a reason that, for example, it is within the advertisement display period (Yes), additional information display control unit 46 instructs control unit 41 to display the advertisement information. According to this instruction, control unit 41 controls each circuit block to continue displaying the advertisement information when the advertisement information is being displayed on displaying unit 54. Further, control unit 41 controls each circuit block to, when the advertisement information is not displayed on displaying unit 54, output the obtained advertisement information to video output unit 44, and cause video output unit 44 to superimpose the advertisement information input from control unit 41 on video signals input from input unit 65 and display the advertisement information on displaying unit 54 (step S14).

Next, additional information display control unit 46 performs screen layout change detection (step S15). The screen layout change detection is to detect whether or not STB 14 which outputs video signals displays OSD image 52 (Case 1) and whether or not content is reduced and displayed (Case 2). In the present exemplary embodiment, a transition from a state where a normal video is displayed (e.g. FIG. 3B) to Case 1 (e.g. the video illustrated in FIG. 3C) or Case 2 (e.g. the video illustrated in FIG. 3D) is "a change of a screen layout". Details of the screen layout change detection will be described later.

Further, additional information display control unit 46 determines whether or not a change of the screen layout has been detected (step S16).

When it is determined in step S16 that "the change of the screen layout has been detected" (Yes), additional information display control unit 46 instructs control unit 41 to hide the advertisement information. When being instructed to hide the advertisement information by additional information display control unit 46, control unit 41 stops outputting the advertisement information to video output unit 44 to hide the advertisement information which is being displayed on displaying unit 54 (step S17).

When it is determined in step S16 that "the change of the screen layout has not been detected" (No), control unit 41 continues displaying the advertisement information, and repeats a series of operations from step S10 to step S16 until the advertisement display period included in the advertisement display control information ends. Further, when the advertisement display period ends, additional information display control unit 46 instructs control unit 41 to hide the advertisement information.

Video reception device 40 repeats a series of these operations.

Next, the screen layout change detection in step S15 will be described.

[1-2-2. Operation of Screen Layout Change Detection]

Figure 5:
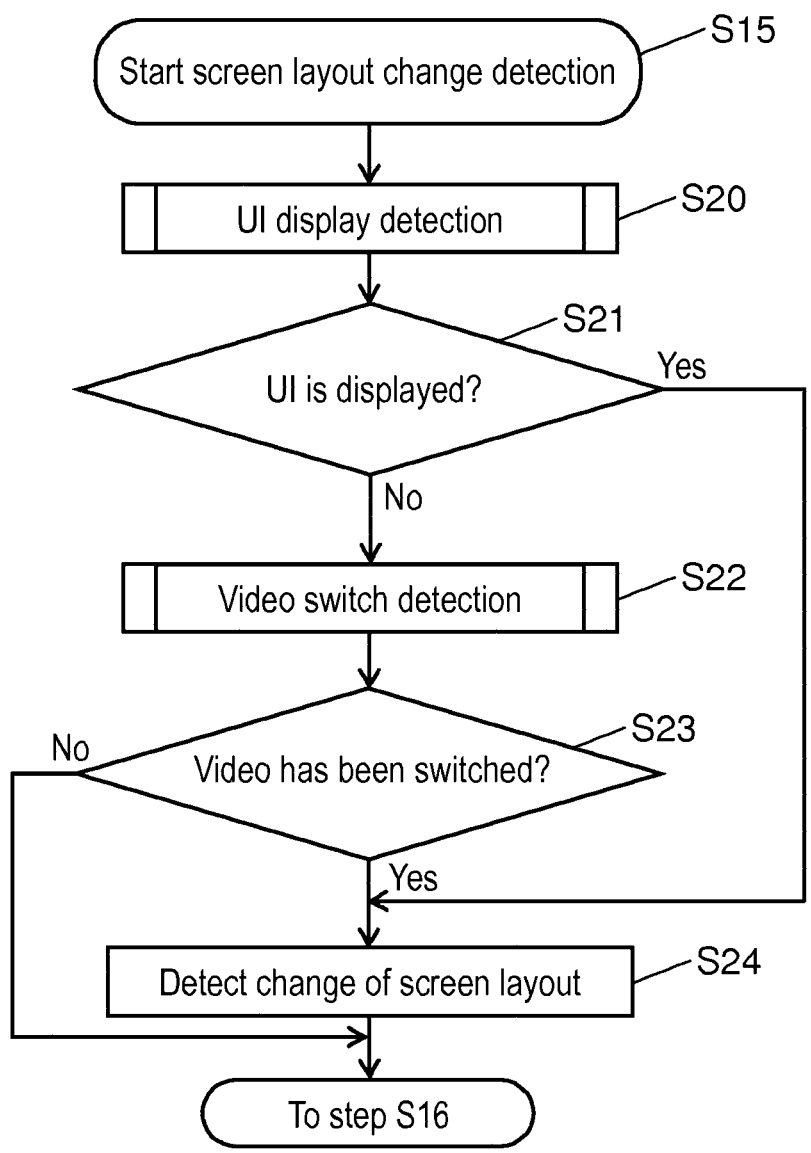
FIG. 5 is a flowchart schematically illustrating an operation of screen layout change detection performed by the video reception device according to the first exemplary embodiment.

FIG. 5 is a flowchart schematically illustrating an operation of the screen layout change detection performed by video reception device 40 according to the first exemplary embodiment.

Additional information display control unit 46 performs UI (User Interface) display detection (step S20). The UI display detection is to determine a state of a screen layout of video signals, and detect that OSD image 52 is displayed or that content is reduced and displayed.

An outline of the UI display detection will be described with reference to FIGS. 6A to 6C.

FIG. 6A is a view schematically illustrating an example of template matching performed by video reception device 40 according to the first exemplary embodiment. FIG. 6B is a view schematically illustrating another example of template matching performed by video reception device 40 according to the first exemplary embodiment. FIG. 6C is a view schematically illustrating an example of template image group 60 used for template matching performed by video reception device 40 according to the first exemplary embodiment. In addition, frames indicating search areas 61 illustrated in FIGS. 6A and 6B are indicated for ease of description, and these frames are not actually displayed on displaying unit 54.

As illustrated in FIG. 6C, template image group 60 includes an OSD image group and an icon image group. A design of OSD images varies per model of STB 14. The OSD image group includes OSD images of a plurality of these models, and each OSD image is linked with information of a model which generates each OSD image. Further, STB 14 displays a plurality of icons whose designs are different. The icon image group includes a plurality of icon images.

As illustrated in FIGS. 6A and 6B, when performing the UI display detection, additional information display control unit 46 sets search area 61 to video 50 based on video signals. For example, a size which is ⅙ of video 50 is set to search area 61. In addition, search area 61 is by no means limited to this size, and may be set to a size such as ⅛, ⅑ or 1/16 of video 50 suitable for template matching.

In addition, FIG. 6A illustrates an example where the video illustrated in FIG. 3C is template-matched, and FIG. 6B illustrates an example where the video illustrated in FIG. 3D is template-matched.

Further, additional information display control unit 46 template-matches template image group 60 and search area 61 while gradually moving search area 61 (while, for example, moving search area 61 in a direction indicated by arrows in FIGS. 6A and 6B). For example, in the example illustrated in FIG. 6A, according to this template matching, additional information display control unit 46 detects OSD image 52, and thereby detects that video signals output from STB 14 are in the state of Case 1. In the example illustrated in FIG. 6B, according to this template matching, additional information display control unit 46 detects icons 55, and thereby detects that video signals output from STB 14 are in the content reduction display state of Case 2. These specific processing procedures will be described later.

An image used for a user interface such as OSD image 52 or icon 55 will be referred to as a "UI image" below. Further, a state where a UI image is included in a video signal output from STB 14 will be referred to as "UI display".

Furthermore, additional information display control unit 46 determines whether or not a UI is displayed based on a result of the UI display detection in step S20 (step S21).

When it is determined in step S21 that "the UI is displayed" (Yes), additional information display control unit 46 determines that "the change of the screen layout is detected" (step S24). Further, the flow moves to step S16 illustrated in FIG. 4.

When it is determined in step S21 that "the UI is not displayed" (No), additional information display control unit 46 performs video switch detection (step S22). The video switch detection will be described later.

Further, additional information display control unit 46 determines whether or not a video has been switched based on the video switch detection result in step S22 (step S23).

When it is determined in step S23 that "the video has been switched" (Yes), additional information display control unit 46 determines that "the change of the screen layout has been detected" (step S24). Further, the flow moves to step S16 illustrated in FIG. 4.

When it is determined in step S23 that "the video has not been switched" (No), additional information display control unit 46 determines that "the change of the screen layout has not been detected". Further, the flow moves to step S16 illustrated in FIG. 4.

Next, the UI display detection in step S20 will be described.

[1-2-3. Operation of UI Display Detection]

Figure 7:
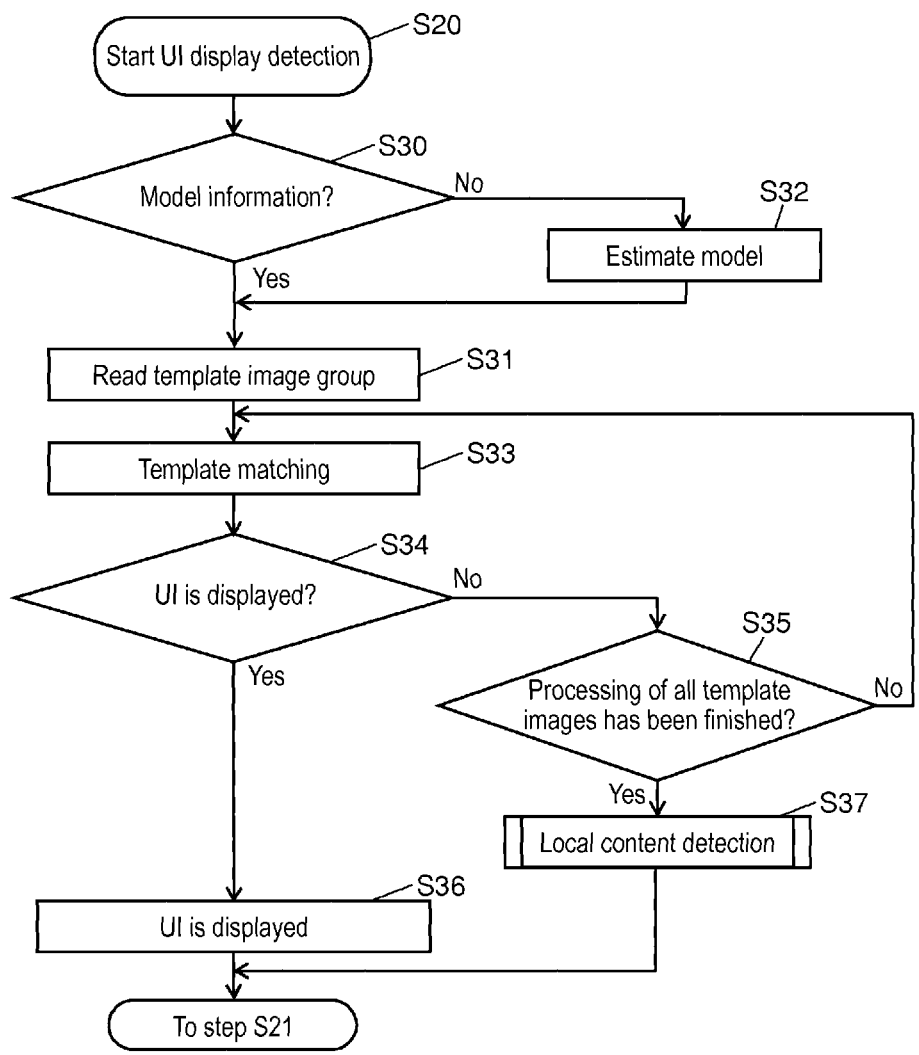
FIG. 7 is a flowchart schematically illustrating an operation of UI display detection performed by the video reception device according to the first exemplary embodiment.

FIG. 7 is a flowchart schematically illustrating an operation of the UI display detection performed by video reception device 40 according to the first exemplary embodiment.

Additional information display control unit 46 determines whether or not model information of the video transmission device (e.g. STB 14) and a template image group associated with this model (the model of STB 14) are stored in storage unit 47 (step S30).

When it is determined in step S30 that the model information of STB 14 and the template image group associated with this model are stored in storage unit 47, and the model of STB 14 can be specified based on these pieces of information (Yes), additional information display control unit 46 reads template image group 60 associated with this model from storage unit 47 (step S31).

Further, additional information display control unit 46 template-matches read template image group 60 and search area 61 of the image which is being displayed on displaying unit 54 (step S33).

The template matching is to search for a template image in a search target image. For example, the template matching is performed as follows. First, a region (search area 61) called a search window is clipped from the search target image. Further, a similarity between search area 61 and a template image is calculated. In this regard, the similarity is calculated by slightly moving search area 61 or changing a size of search area 61. The similarity may be calculated by a generally employed method of, for example, calculating and comparing histograms or converting video signals in a frequency domain and comparing the video signals. Further, the similarity is calculated such that, when the similarity between images is higher, the similarity is higher. When the calculated similarity is equal to or greater than a predetermined threshold value, it is determined that a template image is included in this search area 61. Thus, additional information display control unit 46 searches for a template image in a search target image. In addition, in the present exemplary embodiment, for example, an image search method such as the Viola-Jones method used for face detection may be used instead of template matching or in combination with template matching.

When it is determined in step S30 that "the model of STB 14 cannot be specified" (No), additional information display control unit 46 estimates the model of STB 14 using the result of the video recognition processing performed in step S11, obtains a template image group associated with the estimated model and stores the template image group in storage unit 47 (step S32).

When, for example, a result that content represented by a partial video is the "ABC broadcast program" is obtained as a result of the video recognition processing performed in step S11, additional information display control unit 46 obtains a model which can receive the "ABC broadcast program" using a server (not illustrated) provided by broadcast station 12. When one model is obtained, this model can be estimated as the model of STB 14. Further, when a plurality of models is obtained, a plurality of models can be estimated to include the model of STB 14. These obtained models will be referred to as "model candidates" below. Further, additional information display control unit 46 obtains a template image group associated with a model candidate from the server (not illustrated) which provides the template image group. Additional information display control unit 46 stores the template image group obtained in this way, in storage unit 47.

Further, the flow moves to steps S31 and S33, and additional information display control unit 46 template-matches the obtained template image group and search area 61.

Additional information display control unit 46 determines whether or not a UI is displayed (OSD image 52 or icons 55 are displayed) based on the template matching result (step S34).

When it is determined in step S34 that "OSD image 52 or icons 55 are displayed" (Yes), additional information display control unit 46 determines that "the UI is displayed" (step S36), and the flow moves to step S21 illustrated in FIG. 5.

When it is determined in step S34 that "OSD image 52 or icons 55 are not displayed" (No), additional information display control unit 46 determines whether all template images have been template-matched as in step S33 (step S35).

When it is determined in step S35 that all template images has not been template-matched as in step S33 (No), the flow returns to step S33 and additional information display control unit 46 repeats the operations of steps S33 and S34.

When it is determined in step S35 that "all template images have been template-matched as in step S33" (Yes), additional information display control unit 46 performs the local content detection (step S37) and the flow moves to step S21 illustrated in FIG. 5.

Next, the local content detection in step S37 will be described.

[1-2-4. Operation of Local Content Detection]

Figure 8A:
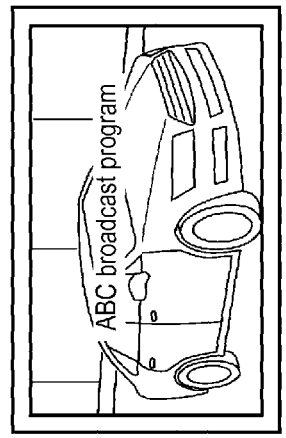
FIG. 8A is a view schematically illustrating an example of a video displayed on the displaying unit of the video reception device according to the first exemplary embodiment.
Figure 8B:
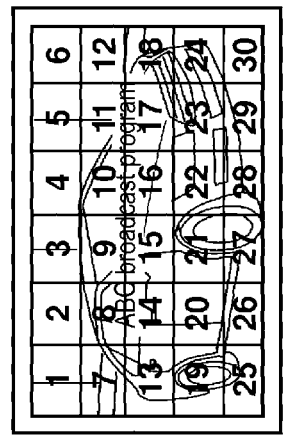
FIG. 8B is a view schematically illustrating an example of a template video used for image comparison performed by the video reception device according to the first exemplary embodiment.
Figure 8C:
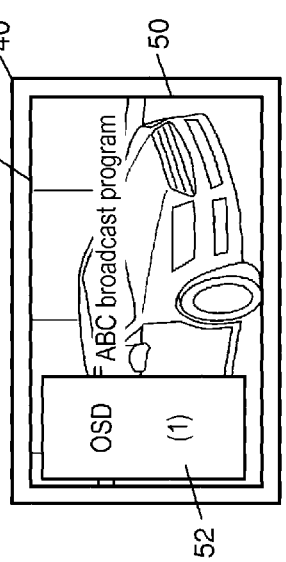
FIG. 8C is a view schematically illustrating an example of a plurality of regions set to a display video for local content detection in the video reception device according to the first exemplary embodiment.
Figure 8D:
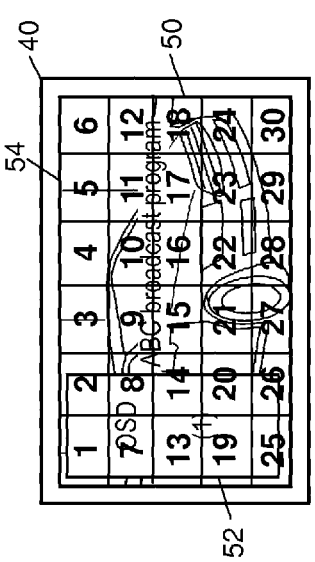
FIG. 8D is a view schematically illustrating an example of a plurality of regions set to a template video for the local content detection in the video reception device according to the first exemplary embodiment.
Figure 8E:
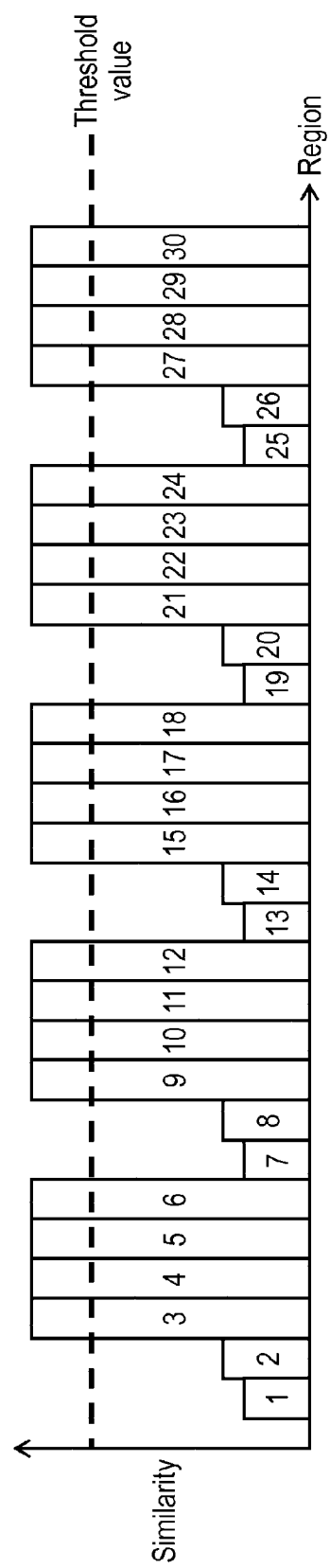
FIG. 8E is a view schematically illustrating an example of a similarity calculated for each of regions in the video reception device according to the first exemplary embodiment.

FIG. 8A is a view schematically illustrating an example of a video displayed on displaying unit 54 of video reception device 40 according to the first exemplary embodiment. FIG. 8B is a view schematically illustrating an example of a template video used for image comparison performed by video reception device 40 according to the first exemplary embodiment. FIG. 8C is a view schematically illustrating an example of a plurality of regions set to a display video for the local content detection in video reception device 40 according to the first exemplary embodiment. FIG. 8D is a view schematically illustrating an example of a plurality of regions set to a template video for the local content detection in video reception device 40 according to the first exemplary embodiment. FIG. 8E is a view schematically illustrating an example of a similarity calculated for each of regions in video reception device 40 according to the first exemplary embodiment.

In addition, in the present exemplary embodiment, when performing local content detection, as illustrated in FIGS. 8C and 8D, additional information display control unit 46 divides one screen into 30 regions of region (1) to region (30), compares a display video and a template video for each of the regions and calculates the similarity. However, the number of regions set to one screen is by no means limited to these numerical values, and may be set to a numerical value suitable to perform the local content detection. Further, lines and numbers for partitioning each region illustrated in FIGS. 8C and 8D are indicated for ease of description, and these lines and numbers are not actually displayed on displaying unit 54. Furthermore, FIG. 8E illustrates an example where each region illustrated in FIG. 8C and each region illustrated in FIG. 8D are compared, and the similarity of each region is calculated and compared with a threshold value.

Figure 9:
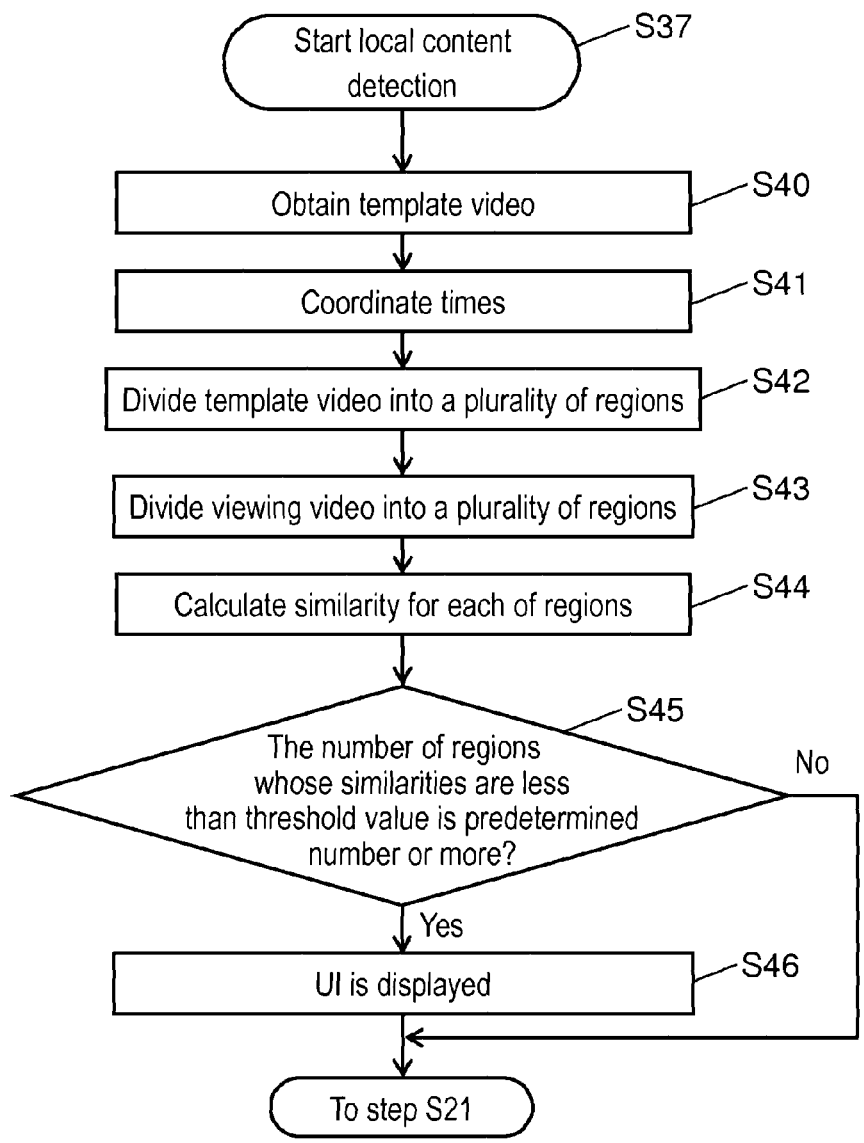
FIG. 9 is a flowchart schematically illustrating an operation of the local content detection performed by the video reception device according to the first exemplary embodiment.

FIG. 9 is a flowchart schematically illustrating an operation of local content detection performed by video reception device 40 according to the first exemplary embodiment.

When additional information display control unit 46 performs local content detection, obtaining unit 66 first obtains a template video from video recognition device 20 through communication network 16 and HTTP transmission/reception unit 42 (step S40). The template video includes video signals of content which video recognition device 20 obtains from the broadcast station, and is included in the video recognition processing result which control unit 41 obtains from video recognition device 20.

The video recognition processing result which control unit 41 obtains from video recognition device 20 includes time information of the template video together with the template video. Additional information display control unit 46 coordinates the time such that the template video and video signal (a video based on these video signals is referred to as a "viewing video" below) input from STB 14 to input unit 65 of video reception device 40 become videos of the same time (step S41).

Next, additional information display control unit 46 divides the template video into a plurality of (30 in the example illustrated in FIG. 8D) regions as illustrated in, for example, FIG. 8D (step S42).

Further, additional information display control unit 46 divides the viewing video into a plurality of (30 in the example illustrated in FIG. 8C) regions as illustrated in, for example, FIG. 8C (step S43).

Next, additional information display control unit 46 compares region (1) of the template video and region (1) of the viewing video, and calculates a similarity of region (1).

Similarly, additional information display control unit 46 compares each subsequent region from region (2) of the template video and each subsequent region from region (2) of the viewing video, and calculates a similarity of each region (step S44). In addition, the similarity may be calculated by a generally employed method of, for example, calculating and comparing histograms or converting video signals in the frequency domain and comparing the video signals. Further, the similarity is calculated such that, when the similarity between images is higher, the similarity is higher.

Next, additional information display control unit 46 compares the similarity calculated in step S44 with a threshold value set in advance. Further, additional information display control unit 46 determines whether or not a number of regions whose similarities are less than the threshold value is equal to or greater than a predetermined number (step S45). This predetermined number is, for example, 2 or may be a numerical value other than 2. Further, the threshold value is desirably set to a numerical value which allows two images to compare to be regarded as the same. For example, according to a configuration of calculating a similarity such that the similarity is 100% when two images to compare are completely the same, the threshold value is 90%. However, the threshold value is by no means limited to this numerical value.

When it is determined in step S45 that "the number of regions whose similarities are less than the threshold value is equal to or greater than the predetermined number (e.g. 2)" (Yes), additional information display control unit 46 determines that "the UI is displayed" (step S46), and the flow moves to step S21 illustrated in FIG. 5.

For example, in the example illustrated in FIG. 8C, OSD image 52 is displayed on regions (1), (2), (7), (8), (13), (14), (19), (20), (25) and (26). As a result, in the example illustrated in FIG. 8E, the similarities of these regions (10 regions) are less than the threshold value. That is, the number of regions whose similarities are less than the threshold value is equal to or greater than the predetermined number (e.g. 2), and therefore additional information display control unit 46 determines that "the UI is displayed on the viewing video" in this example.

When it is determined in step S45 that "the number of regions whose similarities are less than the threshold value is less than the predetermined number" (No), additional information display control unit 46 determines that "the UI is not displayed", and the flow moves to step S21 illustrated in FIG. 5.

Next, the video switch detection in step S22 will be described.

[1-2-5. Operation of Video Switch Detection]

When it is determined in step S21 illustrated in FIG. 5 that "the UI is not displayed" (No), additional information display control unit 46 performs the video switch detection in step S22 and determines whether or not a video has been switched.

Figure 10:
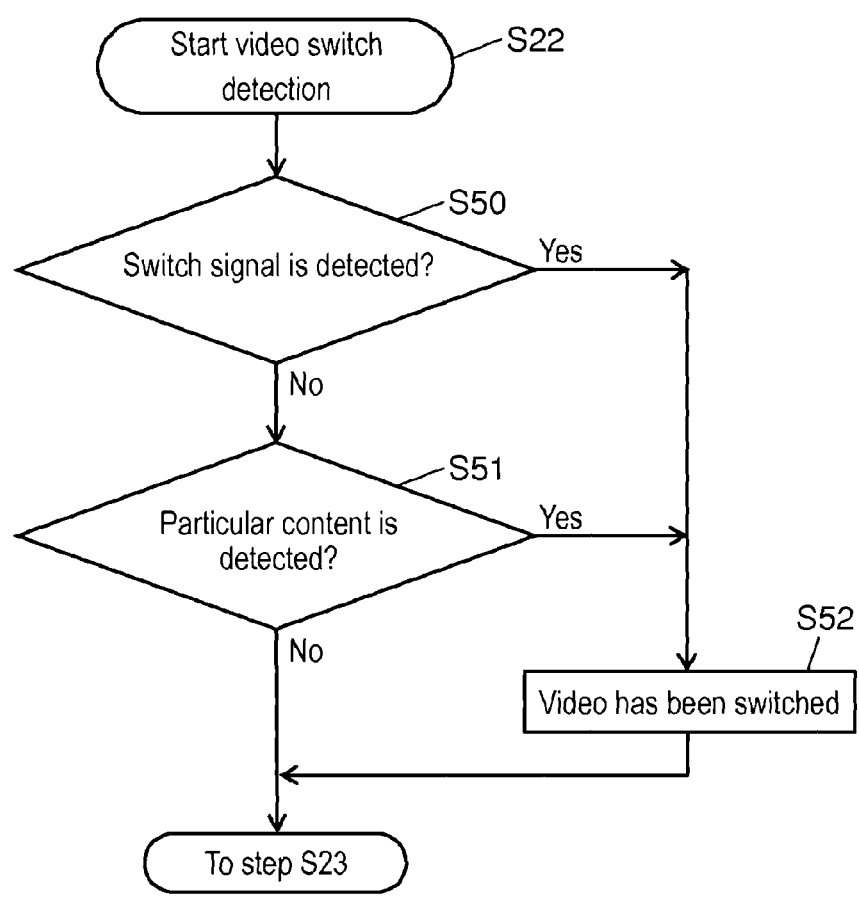
FIG. 10 is a flowchart schematically illustrating an operation of video switch detection performed by the video reception device according to the first exemplary embodiment.

FIG. 10 is a flowchart schematically illustrating an operation of the video switch detection performed by video reception device 40 according to the first exemplary embodiment.

Additional information display control unit 46 detects a switch signal input through input unit 65 (step S50).

When STB 14 switches a channel or switches an input medium according to a user's operation, and a switch signal for notifying these switches is output from STB 14, additional information display control unit 46 detects this switch signal in step S50 (Yes).

Additional information display control unit 46 which has detected the switch signal determines that "the video has been switched" (step S52), and the flow moves to step S23 illustrated in FIG. 5.

When the switch signal is not detected in step S50 (No), additional information display control unit 46 detects a particular content (step S51).

The particular content refers to content which make it possible to determine whether or not a video is switched based on a change of a video signal (or a speech signal or a signal indicating abnormality) when a normal content switches to a particular content. For example, the particular content is, for example, black mute (blue back), audio mute, a stream error, a decrease in a reception level and the like.

When the particular content is detected in step S51 (Yes), additional information display control unit 46 determines that "the video has been switched" (step S52), and the flow moves to step S23 illustrated in FIG. 5.

When the particular content is not detected in step S51 (No), additional information display control unit 46 determines that "the video has not been switched", and the flow moves to step S23 illustrated in FIG. 5.

Figure 11B:
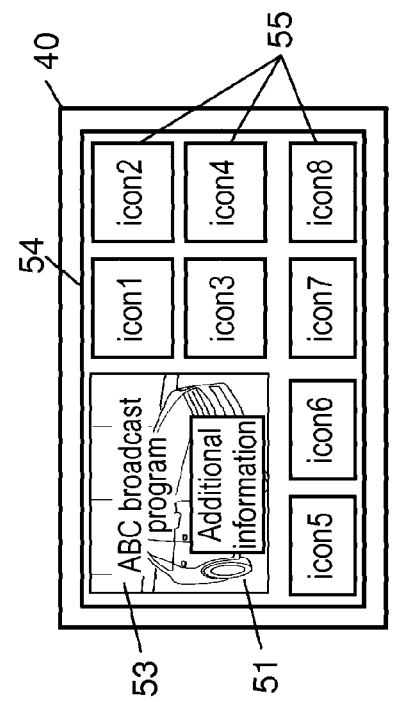
FIG. 11B is a view schematically illustrating still another example of a video displayed on the displaying unit of the video reception device according to the first exemplary embodiment.
Figure 11A:
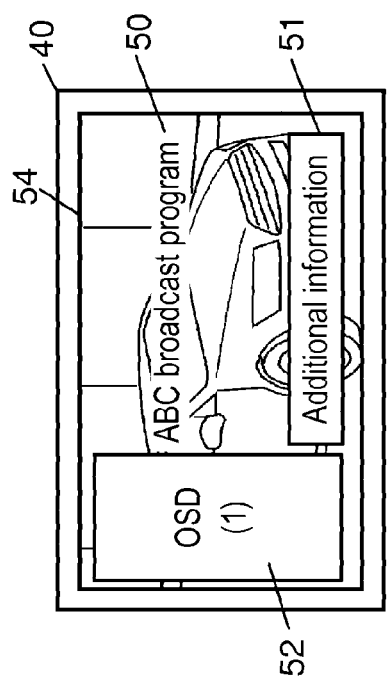
FIG. 11A is a view schematically illustrating another example of a video displayed on the displaying unit of the video reception device according to the first exemplary embodiment.

In the present exemplary embodiment, an operation of hiding additional information 51 (e.g. advertisement information) which is being displayed on displaying unit 54 in video reception device 40 when a screen layout of the video which is being displayed on displaying unit 54 is changed has been described. However, the present exemplary embodiment is by no means limited to this configuration. When, for example, the screen layout of the video which is being displayed on displaying unit 54 is changed, a display size, a display position or the like of additional information 51 may be changed according to the changed screen layout. FIG. 11A is a view schematically illustrating another example of a video displayed on displaying unit 54 of video reception device 40 according to the first exemplary embodiment. FIG. 11B is a view schematically illustrating still another example of a video displayed on displaying unit 54 of video reception device 40 according to the first exemplary embodiment. Video reception device 40 may be configured to change at least one of the display size and the display position of additional information 51 such that additional information 51 does not overlap OSD image 52 as illustrated in an example in FIG. 11A in case of, for example, Case 1 illustrated in FIG. 3C. Alternatively, video reception device 40 may be configured to change the display size and the display position of additional information 51 such that additional information 51 does not overlap icons 55 as illustrated in an example in FIG. 11B in case of, for example, Case 2 illustrated in FIG. 3D. Thus, in the present exemplary embodiment, the display size or the display position of additional information 51 may be changed to prevent visibility of a UI image such as OSD image 52 or icons 55 from lowering since additional information 51 overlaps the UI image. Alternatively, a displaying content of additional information 51 itself may be changed or a design of additional information 51 may be changed to an icon which visually represents additional information 51.

[1-3. Effect and Others]

As described above, in the present exemplary embodiment, video reception device 40 is configured to transmit and receive data through communication network 16, and includes input unit 65, video extraction unit 45, control unit 41 and additional information display control unit 46. Input unit 65 is configured to receive an input of video signals output from the video transmission device (e.g. STB 14) installed outside. Video extraction unit 45 is configured to extract a partial video for video recognition processing, from the video signals. Control unit 41 is configured to perform control of transmitting the partial video to video recognition device 20 connected to communication network 16 so as to request video recognition device 20 to perform the video recognition processing, obtaining a video recognition processing result from video recognition device 20, and obtaining additional information 51 (e.g. advertisement information) based on the video recognition processing result from additional information distribution device 30 connected to communication network 16. Additional information display control unit 46 is configured to perform control of detecting whether or not a screen layout of the video signals has been changed, and superimposing additional information 51 on the video signals based on a result of the detection.

Thus, video reception device 40 can obtain additional information 51 related to the video signals input from the video transmission device, superimpose additional information 51 on the video signals, and perform control of superimposing additional information 51 on the video signals according to a screen layout of the video signals.

For example, the video transmission device such as STB 14 receives a user's operation such as volume adjustment or menu display. Even when OSD image 52 is superimposed on video 50 according this operation (e.g. the state of Case 1 illustrated in FIG. 3C) or even when the menu display mode is set by the user's operation, and a plurality of icons 55 and reduced video 53 obtained by reducing video 50 are provided in a mixed arrangement on one screen (e.g. the state of Case 2 illustrated in FIG. 3D), these video signals are output without being distinguished from normal video signals (video signals of video 50 alone). Hence, video reception device 40 has difficulty in determining whether video signals input to input unit 65 are in the normal state, the state of Case 1, the state of Case 2 or other states.

When such a change of the screen layout occurs, video reception device 40 desirably performs control of superimposing additional information 51 (e.g. advertisement information) on video signals immediately according to the changed screen layout. For example, video reception device 40 desirably prevents OSD image 52 or icons 55 from hiding behind additional information 51 by stopping superimposing additional information 51 on video signals or changing a display size, a display position or the like of additional information 51 according to the changed screen layout.

According to the above configuration, when a screen layout of video signals input from the video transmission device (e.g. STB 14) is changed, video reception device 40 according to the present exemplary embodiment can detect the changed screen layout, and stop superimposing additional information 51 on the video signals or change the display size, the display position or the like of additional information 51 according to the detected screen layout. Consequently, even when a UI image such as OSD image 52 or icons 55 appears on video signals input from the video transmission device according to a user's operation, video reception device 40 can prevent visibility of the UI image from lowering since the UI image hides behind additional information 51.

Further, video reception device 40 may include displaying unit 54 which is configured to display a video obtained by superimposing additional information 51 on video signals.

Furthermore, additional information display control unit 46 may be configured to perform control of hiding additional information 51 which is being displayed on displaying unit 54 when detecting the change of the screen layout of video signals input from the video transmission device.

Consequently, when a change of the screen layout of video signals input from the video transmission device (e.g. STB 14) occurs, video reception device 40 can hide additional information 51 which is being displayed on displaying unit 54. Consequently, it is possible to prevent additional information 51 from lowering visibility of an image whose screen layout has been changed.

Further, additional information display control unit 46 may be configured to perform control of detecting whether or not a UI image is included in video signals input from the video transmission device, and hiding additional information 51 which is being displayed on displaying unit 54 based on the detection result.

Consequently, even when a UI image such as OSD image 52 or icons 55 appears on video signals input from the video transmission device (e.g. STB 14) according to a user's operation, video reception device 40 can hide additional information 51 which is being displayed on displaying unit 54. Consequently, it is possible to prevent visibility of the UI image such as OSD image 52 or icons 55 from lowering since the UI image hides behind additional information 51.

Further, video reception device 40 may further include storage unit 47 which is configured to store template image group 60 including a plurality of template images related to a video transmission device which outputs video signals. Furthermore, additional information display control unit 46 is configured to determine whether or not template images are included in the video signals by template-matching search area 61 set to the video signals input from the video transmission device and each of the template images of template image group 60, and detect whether or not a UI image is included in the video signals based on the determination.

Consequently, when a UI image is included in video signals input from the video transmission device (e.g. STB 14), video reception device 40 can detect this UI image by template-matching template images. Consequently, it is possible to adequately determine whether or not to hide additional information 51 which is being displayed on displaying unit 54.

Further, video reception device 40 may further include obtaining unit 66 which is configured to obtain from video recognition device 20 a template video related to video signals input from the video transmission device. Furthermore, additional information display control unit 46 may be configured to divide the video signals and the template video into a plurality of regions (the 30 regions illustrated in FIGS. 8C and 8D), compare the template video and the video signals for each of the regions, calculate a similarity for each of the regions, compare the calculated similarity with a threshold value set in advance, determine whether or not the number of regions whose similarities do not exceed the threshold value is a predetermined number of more, and detect whether or not the UI image is included in the video signals.

Consequently, even when a situation that, even though a UI image is included in video signals input from the video transmission device (e.g. STB 14), this UI image cannot be detected by template-matching template images occurs, video reception device 40 can detect this UI image by comparing the template images and the video signals for each of the regions. Consequently, it is possible to adequately determine whether or not to hide additional information 51 which is being displayed on displaying unit 54.

Further, additional information display control unit 46 may be configured to, when detecting content switching operation performed on the video transmission device which outputs video signals, perform control of hiding additional information 51 which is being displayed on displaying unit 54.

Consequently, when the video transmission device (e.g. STB 14) switches a channel or switches an input according to a user's operation, and the video transmission device outputs a switch signal for notifying these switches, additional information display control unit 46 in video reception device 40 can detect this switch signal and hide additional information 51 which is being displayed on displaying unit 54. Consequently, video reception device 40 can prevent additional information 51 (e.g. advertisement information) related to content before a channel is switched from being left displayed on displaying unit 54, i.e., prevent additional information 51 from being erroneously displayed even though the video transmission device (e.g. STB 14) receives a user's operation such as channel switching and content of video signals input from the video transmission device is switched.

Further, additional information display control unit 46 is configured to, when detecting a particular content whose content switch can be detected, perform control of hiding additional information 51 which is being displayed on displaying unit 54.

Consequently, when video signals input from the video transmission device (e.g. STB 14) switch from a normal content to a particular content (e.g. black mute (blue back), audio mute, stream errors, a decrease in a reception level or the like), video reception device 40 can hide additional information 51 which is being displayed on displaying unit 54. When, for example, a video is disturbed due to a decrease in a broadcast signal reception level or a stream error upon transmission of video signals in the video transmission device, video reception device 40 can hide additional information 51 which is being displayed on displaying unit 54. Alternatively, when the video transmission device receives a user's operation such as channel switching or input switching, video reception device 40 detect a blank image (black mute, blue back, audio mute or the like) which is instantaneously produced upon these operation, and hide additional information 51 which is being displayed on displaying unit 54. Consequently, it is possible to prevent additional information 51 (e.g. advertisement information) related to content before channel switching from being left displayed on displaying unit 54, i.e., prevent additional information 51 from being erroneously displayed.

OTHER EXEMPLARY EMBODIMENT

As described above, the first exemplary embodiment has been described as an exemplary technique disclosed in the present application. However, the technique according to the present disclosure is not limited to this, and is also applicable to exemplary embodiments which are optionally changed, replaced, added and omitted. Further, each component described in the above first exemplary embodiment can also be combined to provide new exemplary embodiments.

Another exemplary embodiment will be described below.

A configuration where video reception device 40 includes displaying unit 54 has been described in the first exemplary embodiment. However, the video reception device according to the present exemplary embodiment is by no means limited to this configuration. The video reception device may not include the displaying unit.

Figure 12:
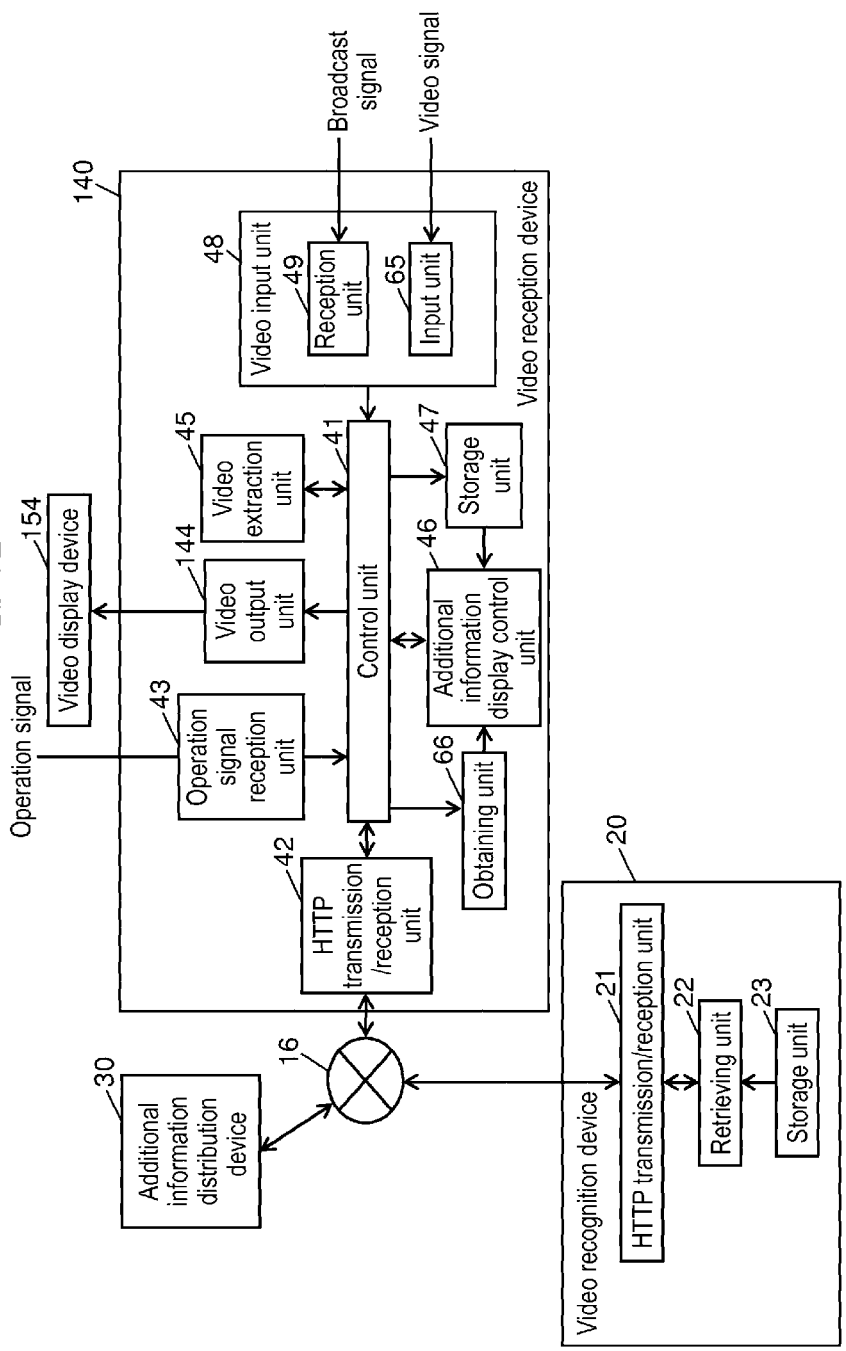
FIG. 12 is a block diagram schematically illustrating an example of configurations of a video recognition device and a video reception device according to another exemplary embodiment.

FIG. 12 is a block diagram schematically illustrating an example of a configuration of video reception device 140 according to another exemplary embodiment. Video reception device 140 illustrated in FIG. 12 differs from video reception device 40 illustrated in FIG. 2 in the first exemplary embodiment in the following points. Video reception device 140 does not include displaying unit 54, and video output unit 144 is configured to output video signals to video display device 154 installed outside through wires or by radio.

Video reception device 140 of this type is, for example, a recording device which has, for example, a recording function, a broadcast signal receiving function, a video signal input function and a video signal output function, and which is configured to transmit video signals to video display device 154 installed outside. Such a recording device is, for example, a hard disk recorder, a DVD recorder, a BD recorder or the like.

In addition, in FIG. 12, components which perform substantially same operations as components which make up video reception device 40 illustrated in FIG. 2 will be assigned the same reference numerals, and will not be described. Further, FIG. 12 illustrates a main circuit block related to an operation described in the present exemplary embodiment, and does not illustrate functions and circuit blocks (e.g. a recording function) related to other operations.

In video reception device 140, additional information display control unit 46 determines whether or not to superimpose additional information 51 on video signals output from video output unit 144 to video display device 154. In addition, an operation of additional information display control unit 46 is the substantially same as that of the first exemplary embodiment. Video reception device 140 employing such a configuration can provide the same effects as those of video reception device 40 described in the first exemplary embodiment.

In addition, a configuration where video reception device 40 transmits a partial video to video recognition device 20 and requests video recognition device 20 to perform content specifying processing has been described in the exemplary embodiment. However, the present disclosure is by no means limited to this configuration. For example, video reception device 40 may be configured to generate a fingerprint (e.g. a hash value of each image which configures a partial image) from a partial image, transmit this fingerprint to video recognition device 20 and request the video recognition device to perform video recognition processing. In this case, video recognition device 20 performs an operation of receiving this fingerprint, cross-checking this fingerprint and the fingerprint generated in advance by video recognition device 20 and stored in storage unit 23, and retrieving content corresponding to the received fingerprint.

In addition, each component described in the present exemplary embodiment may be configured as an independent circuit. Alternatively, each circuit block may be configured such that a program created to realize one or a plurality of circuit blocks is executed by a processor. Further, this program may be obtained by being downloaded from a server or the like or may be obtained through a predetermined recording medium (e.g. an optical disk such as a CD-ROM, a magnetic disk or a semiconductor memory).

Furthermore, each operation of the server described in the present exemplary embodiment may be collectively processed by a single server or may be distributed to and processed by a plurality of servers.

In addition, specific numerical values described in the first exemplary embodiment are only exemplary numerical values in the exemplary embodiment, and the present disclosure is by no means limited to these numerical values. Each numerical value is desirably set to an optimal value according to a specification of a video reception device or the like.

INDUSTRIAL APPLICABILITY

The present disclosure is applicable to a video reception device which can obtain additional information related to video signals input from a video transmission device installed outside, and superimpose the obtained additional information on the video signals. More specifically, the present disclosure is applicable to a television receiver, a hard disk recorder, a DVD recorder, a BD recorder and the like.

REFERENCE MARKS IN THE DRAWINGS 10 additional information display system
12 broadcast station
14 STB
16 communication network
20 video recognition device
21, 42 HTTP transmission/reception unit
22 retrieving unit
23, 47 storage unit
30 additional information distribution device
40, 140 video reception device
41 control unit
43 operation signal reception unit
44, 144 video output unit
45 video extraction unit
46 additional information display control unit
48 video input unit
49 reception unit
50 video
51 additional information
52 OSD image
53 reduced image
54 displaying unit
55 icon
60 template image group
61 search area
65 input unit
66 obtaining unit
154 video display device

The invention claimed is:

1. A video reception device configured to transmit and receive data through a communication network, the video reception device comprising:
an input unit configured to receive an input of a video signal;
a video extraction unit configured to extract a partial video for video recognition processing, from the video signal;
a control unit configured to perform control of transmitting the partial video to a video recognition device connected to the communication network so as to request the video recognition device to perform the video recognition processing, obtaining a result of the video recognition processing from the video recognition device, and obtaining additional information based on the result of the video recognition processing from an additional information distribution device connected to the communication network;

an additional information display control unit configured to perform control of detecting whether or not a UI (User Interface) image is included in the video signal, and superimposing the additional information on the video signal based on a result of the detection; and an obtaining unit configured to obtain a template video related to the video signal from the video recognition device, wherein the additional information display control unit is configured to hide the additional information, which is being displayed on a displaying unit, in response to detecting that the UI image is included in the video signal, and wherein the additional information display control unit is configured to divide the video signal and the template video into a plurality of regions, compare the template video and the video signal for each of the regions, calculate a similarity for each of the regions, compare the similarity with a threshold value set in advance, determine whether or not a number of regions whose similarities do not exceed the threshold value is equal to or greater than a predetermined number, and detect whether or not the UI image is included in the video signal.

2. The video reception device according to claim 1, further comprising the displaying unit configured to display a video obtained by superimposing the additional information on the video signal.

3. The video reception device according to claim 1, further comprising a storage unit configured to store a template image group including a plurality of template images related to a video transmission device which outputs the video signal, wherein the additional information display control unit is configured to determine whether or not the template images are included in the video signal by template-matching a search area set to the video signal and each of the template images of the template image group, and detect whether or not the UI image is included in the video signal based on the determination.

4. The video reception device according to claim 1, wherein the additional information display control unit is configured to, when detecting a content switching operation performed on a video transmission device which outputs the video signal, perform control of hiding the additional information which is being displayed on the displaying unit.

5. The video reception device according to claim 1, wherein the additional information display control unit is configured to, when detecting a particular content whose content switch can be detected, perform control of hiding the additional information which is being displayed on the displaying unit.

6. An additional information display method of a video reception device configured to transmit and receive data through a communication network, the additional information display method comprising:

extracting a partial video for video recognition processing, from a video signal input from an outside;

transmitting the partial video to a video recognition device connected to the communication network so as to request the video recognition device to perform the video recognition processing, and obtaining a result of the video recognition processing from the video recognition device;

obtaining additional information based on the result of the video recognition processing, from an additional information distribution device connected to the communication network;

detecting whether or not a UI (User Interface) image is included in the video signal;

performing control of superimposing the additional information on the video signal based on a result of the detection; and obtaining a template video related to the video signal from the video recognition device, wherein, in response to detecting that the UI image is included in the video signal, the additional information which is being displayed on a displaying unit is hidden, and wherein the video signal and the template video are divided into a plurality of regions, the template video and the video signal are compared for each of the regions, a similarity is calculated for each of the regions, the similarity is compared with a threshold value set in advance, whether or not a number of regions whose similarities do not exceed the threshold value is equal to or greater than a predetermined number is determined, and whether or not the UI image is included in the video signal is detected.

7. The additional information display method according to claim 6, further comprising displaying, on the displaying unit, a video obtained by superimposing the additional information on the video signal.

8. The additional information display method according to claim 6, further comprising storing a template image group including a plurality of template images related to a video transmission device which outputs the video signal, wherein whether or not the template images are included in the video signal is determined by template-matching a search area set to the video signal and each of the template images of the template image group, and whether or not the UI image is included in the video signal is detected based on the determination.

9. The additional information display method according to claim 6, wherein, when a content switching operation performed on a video transmission device which outputs the video signal is detected, the additional information which is being displayed on the displaying unit is hidden.

10. The additional information display method according to claim 6, wherein, when a particular content whose content switch can be detected is detected, the additional information which is being displayed on the displaying unit is hidden.

11. An additional information display system which comprises a video reception device, a video recognition device, and an additional information distribution device, the devices being configured to transmit and receive data to each other through a communication network, wherein the video reception device includes:

an input unit configured to receive an input of a video signal;

a video extraction unit configured to extract a partial video for video recognition processing, from the video signal;

a control unit configured to perform control of transmitting the partial video to the video recognition device through the communication network so as to request the video recognition device to perform the video recognition processing, obtaining a result of the video recognition processing from the video recognition device through the communication network, and obtaining additional information based on the result of the video recognition processing from the additional information distribution device through the communication network;

an additional information display control unit configured to perform control of detecting whether or not a UI (User Interface) image is included in the video signal, and superimposing the additional information on the video signal based on a result of the detection; and an obtaining unit configured to obtain a template video related to the video signal from the video recognition device, wherein the additional information display control unit is configured to hide the additional information, which is being displayed on a displaying unit, in response to detecting that the UI image is included in the video signal, wherein the video recognition device is configured to perform the video recognition processing on the partial video received through the communication network, and transmit the result of the video recognition processing to the video reception device through the communication network, wherein the additional information distribution device is configured to transmit the additional information corresponding to the result of the video recognition processing received through the communication network, to the video reception device through the communication network, and wherein the additional information display control unit is configured to divide the video signal and the template video into a plurality of regions, compare the template video and the video signal for each of the regions, calculate a similarity for each of the regions, compare the similarity with a threshold value set in advance, determine whether or not a number of regions whose similarities do not exceed the threshold value is equal to or greater than a predetermined number, and detect whether or not the UI image is included in the video signal.

* * * * *